United States Patent

Nagaoka

[11] Patent Number: 5,719,708
[45] Date of Patent: Feb. 17, 1998

[54] ZOOM LENS SYSTEM

[75] Inventor: Toshiyuki Nagaoka, Tokyo-to, Japan

[73] Assignee: Olympus Optical Co., Ltd., Tokyo, Japan

[21] Appl. No.: 571,176

[22] Filed: Dec. 12, 1995

[30] Foreign Application Priority Data

Dec. 12, 1994 [JP] Japan .................................. 6-331412
Dec. 12, 1994 [JP] Japan .................................. 6-331419

[51] Int. Cl.$^6$ .............................. G02B 15/14; G02B 3/02
[52] U.S. Cl. .................................. 359/687; 359/715
[58] Field of Search .................................. 359/687, 715

[56] References Cited

U.S. PATENT DOCUMENTS

| | | | |
|---|---|---|---|
| 4,105,291 | 8/1978 | Tsuji | 359/687 |
| 4,639,096 | 1/1987 | Kitagishi et al. | 359/687 |
| 4,693,566 | 9/1987 | Imaizumi | 359/687 |
| 4,695,133 | 9/1987 | Kitagishi et al. | 359/687 |
| 4,818,083 | 4/1989 | Mihara | 359/687 |
| 4,859,042 | 8/1989 | Tanaka | 359/687 |
| 5,221,994 | 6/1993 | Nishio | 359/687 |
| 5,583,697 | 12/1996 | Mukaiya | 359/687 |

FOREIGN PATENT DOCUMENTS

| | | |
|---|---|---|
| 1-223408 | 9/1989 | Japan . |
| 4-088309 | 3/1992 | Japan . |
| 4-317019 | 11/1992 | Japan . |
| 5-224125 | 9/1993 | Japan . |
| 5-341189 | 12/1993 | Japan . |

*Primary Examiner*—David C. Nelms
*Assistant Examiner*—Evelyn A. Lester
*Attorney, Agent, or Firm*—Cushman, Darby & cushman IP Group of Pillsbury Madison & Sutro LLP

[57] ABSTRACT

A compact zoom lens system which is suited for use with video cameras and has a high vari-focal ratio comprising, in order from the object side, a first positive lens unit, a second negative lens unit, and a plurality of lens units which are disposed on the image side of the second lens unit and have a positive refractive power as a whole, wherein at least two of the lens units are moved along an optical axis during zooming for changing a focal length of the zoom lens system and correcting a deviation of an image surface caused by changing the focal length, wherein a lens unit disposed at an image side location in the zoom lens system has a positive refractive power, and comprises at least one positive lens element and at least two negative lens elements, and wherein a lens element disposed at an image side location in the zoom lens system is a negative meniscus lens element having a concave surface on the image side.

25 Claims, 5 Drawing Sheets

ZOOM LENS SYSTEM

BACKGROUND OF THE INVENTION a) Field of the Invention

The present invention relates to a compact zoom lens system which is suited for use with video cameras, and has a high vari-focal ratio on the order of 6 to 8 and an F number on the order of 2.0.

b) Description of the Prior Art

It is desirable to obtain compact lens systems having high vari-focal ratios and high imaging performance for use with compact video cameras which have sophisticated functions and are equipped with minute image pickup devices such as CCD's.

For obtaining a compact zoom lens system which has a high vari-focal ratio, it is common to compose a lens system of a first lens unit having a positive refractive power, a second lens unit having a negative refractive power and a lens unit or lens units disposed on the image side of the second lens unit, as in a case of a lens system disclosed by Japanese Patent Kokai Publication No. Hei 4-88,309 which is composed of four lens units of a positive lens unit, a negative lens unit, a positive lens unit and a positive lens unit or a lens system disclosed by Japanese Patent Kokai Publication No. Hei 5-224,125 which is composed of five lens units of a positive lens unit, a negative lens unit, a positive lens unit, a positive lens unit and a negative lens unit.

For reducing variations of aberrations caused by zooming the lens systems, including the conventional zoom lens systems described above, it is desirable to correct aberrations favorably and independently in each of the lens units which make up the zoom lens systems. However, the lens units adopted for each of the conventional examples mentioned above have strong refractive powers for configuring the zoom lens system to be compact and cannot correct aberrations sufficiently favorably and independently themselves, whereby the zoom lens system cannot provide images of high enough quality for use with the minute image pickup devices such as CCD's. The second lens unit which is primarily for changing a focal length of the zoom lens system. In particular, it has a strong refractive power for shortening a moving distance thereof or a total length of the zoom lens system, thereby producing aberrations in large amounts and allowing aberrations to be remarkably varied by zooming.

SUMMARY OF THE INVENTION

A primary object of the present invention is to provide a compact zoom lens system which is suited for use with video cameras, and has high optical performance and a vari-focal ratio on the order of 6 to 8.

The zoom lens system according to the present invention, which has a first embodiment thereof, is characterized in that: it is composed, in order from the object side, of a first lens unit having a positive refractive power, a second lens unit having a negative refractive power and a plurality of lens units which are disposed on the image side of the second lens unit and have a positive refractive power as a whole; at least two of the lens units are moved along an optical axis during zooming for changing a focal length of the zoom lens system and correcting a deviation of an image surface caused due to the change of the focal length; a lens unit disposed at an image side location in the zoom lens system, or a rearmost lens unit has a positive refractive power, and comprises at least one positive lens element and at least two negative lens elements; a lens element disposed at an image side location in the zoom lens system, or a rearmost lens element is a meniscus lens element which has a concave surface on the image side and a negative refractive power; and the zoom lens system is configured so as to satisfy the following conditions (1) through (5):

$$-2.0 < f_2/f_W < -1.0 \quad (1)$$

$$1.2 < v_p/v_n \quad (2)$$

$$-15 < f_e/f_W < -2 \quad (3)$$

$$4 < f_1/f_W < 8.4 \quad (4)$$

$$-8.8 < (R_{e2} + R_{e1})/(R_{e2} - R_{e1}) < -1.6 \quad (5)$$

wherein the reference symbols $f_1$ and $f_2$ represent focal lengths of the first lens unit and the second lens unit respectively, the reference symbol $f_W$ designates a focal length of the zoom lens system as a whole at a wide position thereof, the reference symbol $f_e$ denotes a focal length of the lens element disposed at the image side location, the reference symbol $v_p$ represents an Abbe's number of the at least one positive lens element comprised in the lens unit disposed at the image side location, the reference symbol $v_n$ designates an Abbe's number of the at least one negative lens element comprised in the lens unit disposed at the image side location, the reference symbol $R_{e1}$ denotes a radius of curvature on an object side surface of the lens element disposed at the image side location and the reference symbol $R_{e2}$ represents a radius of curvature on an image side surface of the lens element disposed at the image side location.

Further, the zoom lens system according to the present invention, which has a second embodiment thereof, is characterized in that: it is composed, in order from the object side, of a first lens unit having a positive refractive power, a second lens unit having a negative refractive power and a plurality of lens units which are disposed on the image side of the second lens unit and have a positive refractive power as a whole; that at least two of the lens units are moved along an optical axis during zooming for changing a focal length of the zoom lens system and correcting a deviation of an image surface caused due to the change of the focal length; a lens unit which is disposed at an image side location in the zoom lens system has a positive refractive power, and comprises at least one positive lens element and at least two negative lens elements; a lens element disposed at an image side location in the zoom lens system is a meniscus lens element which has a concave surface on the image side and a negative refractive power; the lens unit disposed at the image side location comprises at least one lens element having an aspherical surface which weakens a positive refractive power as portions of the aspherical surface are farther from the optical axis toward a margin thereof; and the zoom lens system is configured so as to satisfy the conditions (1) and (5) mentioned above.

A third embodiment of the zoom lens system according to the present invention is characterized in that: it is composed, in order from the object side, of a first lens unit having a positive refractive power, a second lens unit which has a negative refractive power and is movable during zooming mainly for changing a focal length of the zoom lens system, and a plurality of lens units disposed on the image side of the second lens unit; a lens unit disposed at an image side location in the zoom lens system comprises at least one positive lens element and at least two negative lens elements, has a positive refractive power as a whole and is movable during zooming mainly for correcting a deviation of an image surface caused by zooming; a lens element disposed at an image side location in the zoom lens system has a negative refractive power; and the zoom lens system is configured so as to satisfy the conditions (1) and (4) mentioned above in addition to the following conditions (6) and (7):

$$0.5 < R_{o1}/D_{1T} < 3 \quad (6)$$

$$0.2 < R_{o2}/D_{2T} < 1.9 \quad (7)$$

wherein the reference symbol $D_{1T}$ represents a distance as measured from an object side surface of the lens element disposed at the image side location to the image surface at a tele position of the zoom lens system and the reference symbol $D_{2T}$ designates a distance as measured from an image side surface of the lens element disposed at the image side location to the image surface at the tele position of the zoom lens system.

A fourth embodiment of the zoom lens system according to the present invention is characterized in that: it is composed, in order from the object side, of a first lens unit having a positive refractive power, a second lens unit having a negative refractive power and a plurality of lens units disposed on the image side of the second lens unit; each of the lens units disposed on the image side of the second lens unit comprises at least one positive lens element and at least one negative lens element; a lens element disposed at an image side location in the zoom lens system is a meniscus lens element which has a concave surface on the image side and a negative refractive power; and a lens unit disposed at an image side location in the zoom lens system comprises at least one lens element having at least one aspherical surface which weakens a positive refractive power as portions of the aspherical surface are farther from an optical axis toward a margin thereof.

The zoom lens system according to the present invention, has a fifth embodiment thereof characterized in that: it is composed, in order from the object side, of a first lens unit having a positive refractive power, a second lens unit having a negative refractive power and a plurality of lens units which are disposed on the image side of the second lens unit and have a positive refractive power as a whole; a lens element disposed at an image side location in the zoom lens system is a meniscus lens element which has a concave surface on the image side and a negative refractive power; a lens unit disposed at an image side location in the zoom lens system comprises at least two negative lens elements and at least one positive lens element, and has a positive refractive power as a whole; the lens unit disposed at the image side location is moved toward the object side for focusing the zoom lens system; and the zoom lens system is configured so as to satisfy the condition (4) mentioned above.

The zoom lens system according to the present invention, has a sixth embodiment thereof, characterized in that: it is composed, in order from the object side, of a first lens unit having a positive refractive power, a second lens unit having a negative refractive power, a third lens unit having a positive refractive power and at least one lens unit disposed on the image side of the third lens unit; the second lens unit is movable during zooming mainly for changing a focal length of the zoom lens system; the third lens unit is kept stationary during zooming, and comprises at least one positive lens element and at least one negative lens element; a lens unit disposed at an image side location in the zoom lens system comprises at least one positive lens element and at least two negative lens elements; a lens element disposed at an image side location in the zoom lens system and the zoom lens system is configured so as to satisfy the conditions (1) and (2) mentioned above.

The zoom lens system according to the present invention has a seventh embodiment thereof, characterized in that: it is composed, in order from the object side, of a first lens unit having a positive refractive power, a second lens unit having a negative refractive power, a third lens unit having a positive refractive power and a fourth lens unit having a positive refractive power; the first lens unit is kept stationary for zooming, the second lens unit is movable for zooming, the third lens unit is kept stationary for zooming and the fourth lens unit is movable for zooming; and a lens element disposed at an image side location in the fourth lens unit is a meniscus lens element which has a concave surface on the image side and a negative refractive power.

The zoom lens system according to the present invention has an eighth embodiment thereof, with characteristics which are the same as those of the seventh composition thereof, except for three facts that the third lens unit comprises at least one positive lens element and at least one negative lens element, the fourth lens unit comprises at least two positive lens elements and at least two negative lens elements, and a negative meniscus lens element is disposed at an image side location in the fourth lens unit.

DETAILED DESCRIPTION OF THE PREFERRED EMBODIMENTS

Figure 1:
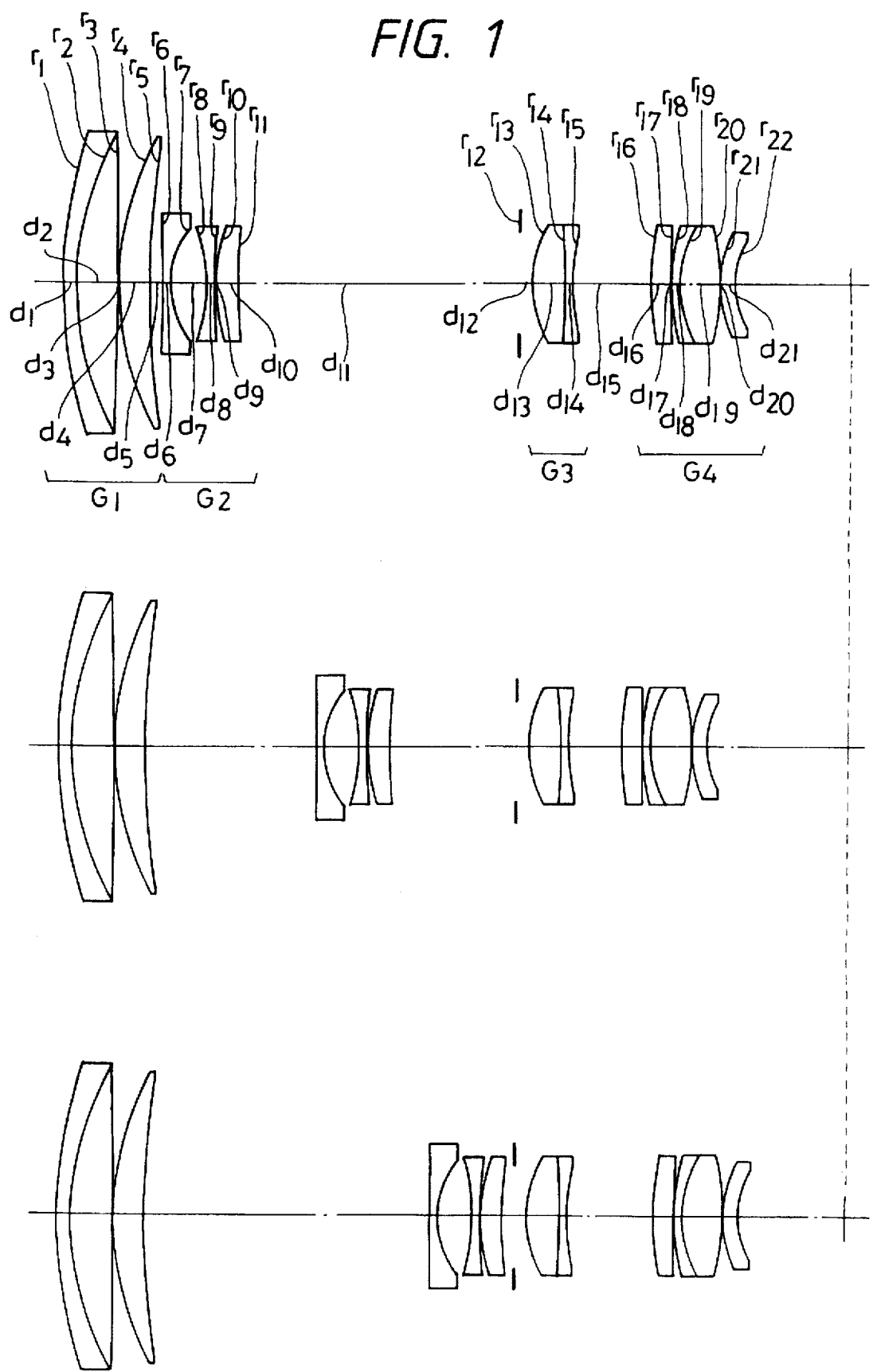
FIG. 1 is a sectional view illustrating the first embodiment of the zoom lens system according to the present invention.

When the zoom lens system according to the present invention is configured according to the first embodiment thereof, it consists, in order from the object side, of a first lens unit having a positive refractive power, a second lens unit having a negative refractive power, and a plurality of lens units which are disposed on the image side of the second lens unit and have a positive refractive power as a whole. In this composition, a lens unit which is disposed at an image side location in the zoom lens system comprises at least one positive lens element and at least two negative lens elements, and has a positive refractive power as a whole; a lens element disposed at an image side location in the zoom lens system is a meniscus lens element which has a concave surface on the image side and a negative refractive power; and that the zoom lens system is configured so as to satisfy the following conditions (1), (2), (3), (4) and (5):

$$-2.0 < f_2/f_W < -1.0 \tag{1}$$

$$1.2 < v_p/v_n \tag{2}$$

$$-15 < f_e/f_W < -2 \tag{3}$$

$$4 < f_1/f_W < 8.4 \tag{4}$$

$$-8.8 < (R_{e2}+R_{e1})/(R_{e2}-R_{e1}) < -1.6 \tag{5}$$

wherein the reference symbol $f_1$ represents a focal length of the first lens unit, the reference symbol $f_2$ designates a focal length of the second lens unit, the reference symbol $f_e$ denotes a focal length of the lens element disposed at the image side location, the reference symbol $f_W$ represents a focal length of the zoom lens system as a whole at a wide position thereof, the reference symbol $v_p$ designates an Abbe's number of the at least one positive lens element comprised in the lens unit disposed at the image side location, the reference symbol $v_n$ denotes an Abbe's number of at least one negative lens element comprised in the lens unit disposed at the image side location, the reference symbol $R_{e1}$ represents a radius of curvature on an object side surface of the lens element disposed at the image side location and the reference symbol $R_{e2}$ designates a radius of curvature on an image side surface of the lens element disposed at the image side location.

When a zoom lens system is composed, in order from the object side, of a first lens unit having a positive refractive power, a second lens unit having a negative refractive power and lens units disposed on the image side of the second lens unit, it is desirable for shortening a total length of the zoom lens system while maintaining high imaging performance thereof to strengthen refractive powers of the lens units disposed on the image side of the second lens unit without strengthening the refractive power of the second lens unit.

In case of the zoom lens system according to the present invention, it is configured so as to satisfy the condition (1) so that the second lens unit has a refractive power of an adequate value. If the upper limit of −1.0 of the condition (1) is exceeded, the second lens unit will have a strong refractive power, thereby producing aberrations, spherical aberration and longitudinal chromatic aberration in particular, in large amounts and allowing aberrations to be varied remarkably by zooming. If the lower limit of −2.0 of the condition (1) is exceeded, in contrast, the second lens unit will have a weak refractive power and must be moved for a long distance for zooming, thereby making it difficult to shorten a total length of the zoom lens system.

When the refractive powers of the lens units disposed on the image side of the second lens unit are strengthened without strengthening the refractive power of the second lens unit, the former lens units tend to produce a positive Petzval's sum and longitudinal chromatic aberration in large amounts. Due to a fact that these lens units have imaging functions in particular, the lens unit which is disposed at the image side location and has the positive refractive power aggravate these aberrations. For obtaining a zoom lens system having high imaging performance, it is therefore necessary to correct these aberrations favorably. Further, for reducing variations of aberrations caused by zooming, it is desirable to correct aberrations favorably and independently in each of the lens units which are used for composing the zoom lens system.

Also, in the zoom lens system according to the present invention, it is desirable to correct a Petzval's sum and longitudinal chromatic aberration to favorable levels independently in the lens unit which has imaging functions and are disposed at the image side location.

Since the second lens unit of the zoom lens system according to the present invention has a refractive power weak enough to satisfy the condition (1) for reducing the variations of aberrations to be caused by zooming the lens system, the second lens unit produces a negative Petzval's sum in a small amount and, since the zoom lens system as a whole tends to produce a positive Petzval's sum, it is necessary to favorably correct a positive Petzval's sum produced by the lens element disposed at the image side location.

For the reasons described above, it is necessary, for configuring the zoom lens system according to the present invention so as to have high imaging performance, to favorably correct the positive Petzval's sum and longitudinal chromatic aberration produced by the lens units disposed at the image side location.

In the zoom lens system according to the present invention, the lens unit disposed at the image side location comprises at least one positive lens element and at least two negative lens elements, and the lens element disposed at the image side location is the meniscus lens element which has the concave surface on the image side and the negative refractive power, and this zoom lens system is configured so as to satisfy the conditions (2) and (3) mentioned above.

Generally speaking, a Petzval's sum can be corrected by selecting glass materials having high refractive indices for positive lens elements and using glass materials having low refractive indices for negative lens elements. Further, chromatic aberration can be corrected by selecting glass materials having strong dispersive powers for positive lens elements and using glass materials having weak dispersive powers for negative lens elements. Under the present circumstances, however, chromatic aberration and a Petzval's sum can be corrected at the same time only within a limited range since glass materials having weak dispersive powers have low refractive indices and glass materials having strong dispersive powers have high refractive indices within a range of the optical glass materials currently available. In the zoom lens system according to present invention, the at least one positive lens element and at least one negative lens element are used for composing the lens unit disposed at the image side location which are made of glass materials having Abbe's numbers largely different from each other, and a Petzval's sum is corrected by the other negative lens element. In other words, chromatic aberration is corrected favorably in the lens unit disposed at the image side location by correcting a Petzval's sum with the negative lens element disposed at an image side location in the lens unit used at the image side location, and by controlling an amount of longitudinal chromatic aberration with a combination of a positive lens element which has a positive refractive power as a whole and is made of a glass material having a low refractive index and a weak dispersive power, and a negative lens element made of a glass material having a high refractive index and a strong dispersive power.

The condition (2) is required for favorably correcting longitudinal chromatic aberration. If this condition is not satisfied, it will be difficult to favorably correct longitudinal chromatic aberration in the lens unit disposed at the image side location.

Further, it is desirable that the negative lens element which has the function to correct a Petzval's sum and is to be disposed at the image side location is configured so as to have a refractive power satisfying the condition (3). If the lower limit of −15 of the condition (3) is exceeded, the negative lens element disposed at the image side location will have a weak refractive power and can hardly correct a Petzval's sum favorably. If the upper limit of −2 of the condition (3) is exceeded, in contrast, a Petzval's sum will be overcorrected and an image surface will undesirably be tilted toward a side opposite to the object side.

Furthermore, it is desirable to configure the negative lens element having the function to correct a Petzval's sum as a meniscus lens element having a concave surface on the image side and dispose this lens element at an image side location at which marginal rays are relatively low. By disposing this negative meniscus lens element at such a location, a Petzval's sum can be corrected favorably without aggravating spherical aberration or coma. If a negative meniscus lens element which has a concave surface on the object side or a biconcave lens element is disposed at such a location, it will undesirably aggravate spherical aberration and coma in particular.

For configuring the zoom lens system according to the present invention so as to have high imaging performance, it is desirable to select a refractive power for the first lens unit as defined by the condition (4) mentioned above.

If the upper limit of 8.4 of the condition (4) is exceeded, the first lens unit will have a weak refractive power, thereby making it difficult to shorten a total length of the zoom lens system. If the lower limit of 4 of the condition (4) is exceeded, in contrast, the first lens unit will have too strong a refractive power, thereby making it difficult to correct lateral chromatic aberration which is produced remarkably at the wide position in particular.

Moreover, the negative lens element disposed at the image side location in the zoom lens system according to the present invention is configured so as to have a shape satisfying the condition (5).

If the lower limit of −8.8 of the condition (5) is exceeded, the negative lens element will have a weak refractive power and can hardly correct a Petzval's sum. If the upper limit of −1.6 of the condition (5) is exceeded, in contrast, the negative lens element will produce large amounts of negative spherical aberration and coma, which can hardly be corrected independently in the lens unit disposed at the image side location.

A second embodiment of the zoom lens system according to the present invention will be described below. When the zoom lens system according to the present invention has the second composition, it consists, in order from the object side, of a first lens unit having a positive refractive power, a second lens unit having a negative refractive power and a plurality of lens units which are disposed on the image side of the second lens unit and have a positive refractive power as a whole; a lens unit which is disposed at an image side location in the zoom lens system comprises at least one positive lens element and at least two negative lens elements, and has a positive refractive power as a whole; a lens element disposed at an image side location in the zoom lens system is a meniscus lens element which has a concave surface on the image side and has a negative refractive power; at least one lens element used in the lens unit disposed at the image side location has at least one aspherical surface which weakens a positive refractive power as portions of the aspherical surface are farther from an optical axis toward a margin thereof; and the zoom lens system satisfies the conditions (1) and (5) mentioned above.

For configuring the zoom lens system according to the present invention so as to have a short total length, it is desirable to strengthen refractive powers of the lens units which are to be disposed on the image side of the second lens unit. When these lens units have strong refractive powers, however, a lens unit disposed at an image side location in the zoom lens system will have an imaging function and a relatively strong positive refractive power. Accordingly, a Petzval's sum and longitudinal chromatic aberration are apt to be produced in large amounts and it is necessary for obtaining a zoom lens system having high imaging performance to correct these aberrations favorably. For favorable correction of these aberrations, it is desirable to compose the lens unit to be disposed at the image side location of at least one positive lens element and at least two negative lens elements, and configure a lens element to be disposed at an image side location in this lens unit as a meniscus lens element which has a concave surface on the image side and a negative refractive power. By selecting the composition described above for the lens unit to be disposed at the image side location, it is possible to correct a Petzval's sum and longitudinal chromatic aberration even when the lens unit has a strong refractive power. When this lens unit has a strong refractive power, however, the positive lens element disposed in the lens unit tends to produce a large amount of negative spherical aberration which can hardly be corrected by using homogenous lens elements only.

For configuring the zoom lens system according to the present invention so as to have a short total length and high imaging performance, it is desired to favorably correct spherical aberration in addition to a Petzval's sum and longitudinal chromatic aberration produced by the lens unit disposed at the image side location.

For correcting spherical aberration, it is preferable to use, in the lens unit to be disposed at the image side location, at least one lens element having at least one aspherical surface which weakens a positive refractive power as portions of the aspherical surface are farther from an optical axis toward a margin thereof. By using an aspherical surface having a shape functioning as described above in the lens unit disposed at the image side location, it is possible to favorably correct negative spherical aberration produced in this lens unit. If an aspherical surface which strengthens a positive refractive power as portions of the aspherical surface are farther from an optical axis toward a margin thereof is used in the lens unit disposed at the image side location, negative spherical aberration will undesirably be produced in a large amount.

An aspherical surface which is to be used in the zoom lens system according to the present invention has a shape expressed by the following formula (a):

$$x = \frac{y^2/r}{1 + \sqrt{1 - P(y/r)^2}} + \sum_{i=1}^{n} A_{2i} y^{2i} \qquad (a)$$

wherein a direction along the optical axis is taken as the x axis, a direction perpendicular to the optical axis is taken as the y axis, the reference symbol r represents a radius of curvature on a portion of the aspherical surface which is located on the optical axis, reference symbol P designates a conical coefficient and reference symbol $A_{2i}$ denotes an aspherical surface coefficient.

Now, description will be made of a third embodiment of the zoom lens system according to the present invention. The lens system consists, in order from the object side, of a first lens unit having a positive refractive power, a second lens unit which has a negative refractive power and is movable during zooming mainly for changing a focal length of the zoom lens system, and lens units disposed on the image side of the second lens unit; a lens unit disposed at an image side location in the zoom lens system comprises at least one positive lens element and at least two negative lens elements, has a positive refractive power as a whole and is movable during zooming mainly for correcting a deviation of an image surface caused by zooming; a lens element disposed at an image side location in the zoom lens system has a negative refractive power; and the zoom lens system is configured so as to satisfy the conditions (1) and (4) mentioned above in addition to the following conditions (6) and (7):

$$0.5 < R_{o1}/D_{1T} < 3 \quad (6)$$

$$0.2 < R_{o2}/D_{2T} < 1.9 \quad (7)$$

wherein the reference symbol $D_{1T}$ represents a distance as measured from an object side surface of the lens element disposed at the image side location to the image surface at a tele position of the zoom lens system and the reference symbol $D_{2T}$ designates a distance as measured from an image side surface of the lens element disposed at the image side location to the image surface at the tele position.

When an attempt is made to shorten a total length of the zoom lens system according to the present invention by strengthening refractive powers of the lens units which are to be disposed on the image side of the second lens unit, a lens unit which serves mainly for imaging and is to be disposed at the image side location tends to produce aberrations in large amounts. This lens unit produces a Petzval's sum and longitudinal chromatic aberrations, in particular, in large amounts. Therefore, the lens unit to be disposed at the image side location comprises at least one positive lens element and at least two negative lens elements as described above for enabling correction of the aberrations mentioned above. Further, the negative lens element which has a function to correct a Petzval's sum is disposed at the image side location for favorably correcting spherical aberration of high orders and coma in particular produced by the lens unit. Furthermore, it is desirable to configure this negative lens element so as to satisfy the above-mentioned conditions (6) and (7).

Theoretically speaking, it is desirable to configure the negative lens element to be disposed at the image side location so as to have a shape which is nearly aplanatic with regard to an image point for favorably correcting a Petzval's sum without aggravating spherical aberration or coma. By selecting such a shape for the negative lens element, it is possible to favorably correct a Petzval's sum without aggravating spherical aberration or coma. In practice wherein residues of aberrations produced by lens elements other than that disposed at the image side location are to be corrected and aberrations are to be balanced at different zoomed positions, however, the aplanatic condition is not applicable strictly to the lens element, and it is sufficient to configure the lens element so as to satisfy the conditions (6) and (7) mentioned above.

If the lower limit of 0.5 of the condition (6) is exceeded, the object side surface of the above-mentioned negative lens element will undesirably produce negative spherical aberration and coma in large amounts. If the upper limit of 3 of the condition (6) is exceeded, in contrast, this object side surface will produce negative spherical aberration and coma in small amounts, whereby the lens unit disposed at the image side location will undesirably produce positive spherical aberration and coma in large amounts.

If the lower limit of 0.2 of the condition (7) is exceeded, the image side surface of the negative lens element will produce positive spherical aberration of high orders and coma in large amounts. If the upper limit of 1.9 of the condition (7) is exceeded, this surface will produce negative spherical aberration and coma in large amounts.

The zoom lens system of the present invention according to a fourth embodiment is composed, in order from the object side, of a first lens unit having a positive refractive power, a second lens unit having a negative refractive power and a plurality of lens units disposed on the image side of the second lens unit; each of the lens units disposed on the image side of the second lens unit comprises at least one positive lens element and at least one negative lens element; a lens unit disposed at an image side location in the zoom lens system comprises at least one positive lens element and at least two negative lens elements; a lens element disposed at an image side location in the zoom lens system is a meniscus lens element which has a concave surface on the image side and a negative refractive power; and the lens unit disposed at the image side location comprises at least one lens element having at least one aspherical surface which weakens a positive refractive power as portions of the spherical surface are farther from an optical axis toward a margin thereof.

For shortening a total length of the zoom lens system according to the present invention while maintaining high imaging performance thereof, the lens units disposed on the image side of the second lens unit have strong refractive powers. Accordingly, it is rather hard to correct a Petzval's sum, longitudinal chromatic aberration and spherical aberration produced by these lens units. For correcting these aberrations, the zoom lens system according to the present invention has the fourth composition described above wherein the lens unit disposed at the image side location has a positive refractive power, and comprises at least one positive lens element and at least two negative lens elements, the lens element disposed at the image side location is configured as the meniscus lens element which has the concave surface on the image side, and the lens unit disposed at the image side location comprises at least one lens element having at least one aspherical surface which weakens a positive refractive power as portions of the aspherical surface are farther from the optical axis toward a margin thereof.

Out of the lens units disposed on the image side of the second lens unit, the lens unit, or each lens unit other than that disposed at the image side location, has a refractive power weaker than that of the lens unit disposed at the image side location and produces aberrations in amounts smaller than those of aberrations produced by the lens unit disposed at the image side location. Due to a fact that a diverging light bundle coming from the second lens unit is incident on the lens unit (or the lens units) disposed on the object side, however, the lens unit (or the lens units) disposed on the object side is (or are) apt to produce longitudinal chromatic aberration in a large amount. It is necessary to correct this longitudinal chromatic aberration for configuring the zoom lens system according to the present invention so as to have high imaging performance.

For this reason, it is desirable to configure a lens unit (or each of lens units) which is (or are) to be disposed on the image side of the second lens unit so as to comprise at least one positive lens element and at least one negative lens element. By configuring a lens unit (or lens units) to be disposed on the image side of the second lens unit as described above, it is possible to favorably correct longitudinal chromatic aberration produced in the lens unit (or each of the lens units). When each of the lens units is composed only of a single lens element, it will be difficult to correct longitudinal chromatic aberration.

The zoom lens system according to the present invention has a fifth embodiment thereof which consists, in order from the object side, of a first lens unit having a positive refractive power, a second lens unit having a negative refractive power and a plurality of lens units disposed on the image side of the second lens unit. In the fifth embodiment, the plurality of lens units disposed on the image side of the second lens unit have a positive refractive power as a whole, a lens element disposed at an image side location in the zoom lens system is a meniscus lens element which has a concave surface on the image side and a negative refractive power, a lens unit disposed on an image side location in the zoom lens system comprises at least two negative lens elements and at least one positive lens element, and has a positive refractive power, and the zoom lens system is focused by moving the lens unit disposed at the image side location toward the object side and is configured so as to satisfy the condition (4) mentioned above.

A lens unit which is to be disposed at an image side location in a zoom lens system has a composition which is important for configuring the lens system so as to have a short total length and high imaging performance. In the fifth composition of the zoom lens system according to the present invention, the lens element disposed at the image side location is a negative meniscus lens element having a concave surface on the image side, and the lens unit disposed at the image side location comprises at least two negative lens elements including the negative meniscus lens element and at least one positive lens element so as to be capable of favorably correcting a Petzval's sum and longitudinal chromatic aberration produced by this lens unit.

For obtaining a zoom lens system having high optical performance on the other hand, it is necessary to reduce variations of aberrations caused by focusing. For reducing variations of aberrations caused by focusing the zoom lens system according to the present invention, it is desirable to move the lens unit disposed at the image side location toward the object side for focusing the lens system on an object located at a short distance. By moving the lens unit disposed at the image side location for focusing the zoom lens system, it is possible to reduce the variations of aberrations caused by focusing. Since a Petzval's sum and longitudinal chromatic aberration are favorably corrected in this lens unit in particular for obtaining high imaging performance, the variations of aberrations can be reduced in the zoom lens system according to the present invention when this lens unit is moved for focusing.

It is conceivable to move the first lens unit having the positive refractive power for focusing the zoom lens system while reducing the variations of aberrations caused by focusing. However, such a focusing method is undesirable since it obliges the first lens unit to use lens elements which have diameters large enough for reserving a required amount of marginal rays. Further, it is undesirable to move a lens unit other than the first lens unit or the lens unit disposed at the image side location for focusing the zoom the zoom lens system since aberrations are varied remarkably by moving the lens unit other than the first lens unit or the lens unit disposed at the image side location.

For the reasons described above, it is desirable to move the lens unit disposed at the image side location for focusing the zoom lens system according to the present invention.

The zoom lens system according to the present invention has a sixth embodiment thereof, composed, in order from the object side, of a first lens unit having a positive refractive power, a second lens unit which has a negative refractive power and is movable during zooming mainly for, changing a focal length of the zoom lens system, a third lens unit which has a positive refractive power and is to be kept stationary during zooming and a lens unit or lens units disposed on the image side of the third lens unit; a lens unit disposed at the image side location comprising at least one positive lens element and at least one negative lens element; a lens element disposed at an image side location in the zoom lens system is a meniscus lens element which has a concave surface on the image side and a negative refractive power; the third lens unit comprises at least one positive lens element and at least two negative lens elements; and the zoom lens system is configured so as to satisfy the above-mentioned conditions (1) and (2).

For shortening a total length while maintaining high imaging performance of a zoom lens system which is composed, in order from the object side, of a first lens unit which has a positive refractive power and is kept stationary during zooming, a second lens unit which has a negative refractive power and is movable for zooming, a third lens unit which has a positive refractive power and is kept stationary during zooming, and a lens unit or lens units disposed on the image side of the third lens unit, it is desirable to strengthen a refractive power or refractive powers of the lens units to be disposed on the image side of the second lens unit without strengthening the refractive power of the second lens unit.

For this reason, the second lens unit has a refractive power within the range defined by the condition (1) in the sixth composition of the zoom lens system according to the present invention.

If the upper limit of $-2.0$ of the condition (1) is exceeded, the second lens unit will have too strong a refractive power, thereby producing remarkable aberrations, spherical aberration and longitudinal chromatic aberration in particular, and allowing large variations of aberrations to be caused by zooming. If the upper limit of $-1.0$ of the condition (1) is exceeded, in contrast, the second lens unit will have a weak refractive power and must be moved for a long distance for zooming, thereby making it impossible to shorten a total length of the zoom lens system.

The lens units which are disposed on the image side of the second lens unit are divided into the third lens unit which transforms a diverging light bundle coming from the second lens unit into a nearly afocal light bundle and a lens unit or lens units disposed on the image side of the third lens unit and serving for imaging the nearly afocal light bundle coming from the third lens unit. The lens unit or the lens units disposed on the image side has or have a relatively strong positive refractive power or relatively strong refractive powers for imaging the light bundle. Accordingly, aberrations produced by a lens unit disposed at the image side location are remarkably aggravated when an attempt is made to shorten a total length of the zoom lens system by strengthening the refractive powers of the lens units disposed on the image side of the second lens unit. Since a positive Petzval's sum and longitudinal chromatic aberration are produced by the lens unit disposed at the image side location, it is necessary to correct these aberrations favorably for obtaining a zoom lens system having high imaging performance.

Further, since a zoom lens system needs to be configured so as to allow minimum variations of aberrations to be caused by zooming the lens system, it is desirable to correct aberrations favorably and independently in lens units to be used for composing the lens system. In case of the zoom lens system according to the present invention also, it is desirable to correct a Petzval's sum and longitudinal chromatic aberration favorably and independently in a lens unit which has the imaging function and is to be disposed at the image side location.

For minimizing variations of aberrations to be caused by zooming, the zoom lens system according to the present invention uses the second lens unit having a refractive power which is weakened so as to satisfy the condition (1). Accordingly, the second lens unit produces a small negative Petzval's sum and the zoom lens system as a whole tends to produce a positive Petzval's sum. It is therefore necessary to favorably correct a positive Petzval's sum produced by the lens unit disposed at the image side location. For configuring the zoom lens system according to the present invention so as to have high imaging performance, it is necessary to favorably correct a positive Petzval's sum and longitudinal chromatic aberration produced by a lens element to be disposed at the image side location as described above.

For correcting these aberrations, it is preferable to compose the lens unit to be disposed at the image side location of at least one positive lens element and at least two negative lens elements, select a lens element which has a concave surface on the image side and a negative refractive power as the lens element to be disposed at an image side location in the zoom lens system, and configure the lens unit to be disposed at the image side location so as to satisfy the condition (2).

Generally speaking, a Petzval's sum can be corrected by selecting a glass material having a high refractive index for positive lens elements and using a glass material having a low refractive index for negative lens elements. Further, chromatic aberration can be corrected by selecting a glass material having a weak dispersive power for positive lens elements and using a glass material having a strong dispersive power for negative lens elements. Within a range of optical glass materials currently available, however, glass materials having weak dispersive powers have low refractive indices and glass materials having strong dispersive powers have high refractive indices. Accordingly, a Petzval's sum and longitudinal chromatic aberration can be corrected favorably at the same time only within a limited range.

In the zoom lens system according to the present invention, at least one positive lens element and at least one negative lens element comprising in the lens unit disposed at the image side location have Abbe's numbers which are largely different from each other for favorably correcting longitudinal chromatic aberration produced by the lens unit disposed at the image side location, and a Petzval's sum is corrected by the other negative lens element. In other words, the Petzval's sum is corrected by the lens element disposed at the image side location, whereas longitudinal chromatic aberration is controlled with a combination of the positive lens element and the negative lens element which have a positive refractive power as a whole, and are made of a glass material having a low refractive index and a weak dispersive power and another glass material having a high refractive index and a strong dispersive power respectively, whereby chromatic aberration is favorably corrected in the lens unit disposed at the image side location.

The condition (2) is required for correcting longitudinal chromatic aberration as described above. If the condition (2) is not satisfied, it will be difficult to correct longitudinal chromatic aberration favorably in the lens unit disposed at the image side location.

Further, it is desirable to configure the negative lens element having the function to correct a Petzval's sum so as to have a meniscus shape which has a concave surface on the image side as described above and dispose this lens element at an image side location at which marginal rays are relatively low. By configuring and disposing this negative lens element as described above, it is possible to correct a Petzval's sum favorably without aggravating spherical aberration or coma. If the negative lens element has a meniscus shape which has a concave surface on the object side or a biconcave shape, spherical aberration of high orders and coma will undesirably be remarkable.

The third lens unit having the positive refractive power functions to transform a diverging light bundle coming from the second lens unit into a nearly afocal light bundle. Accordingly, it is desirable for reducing the variations of aberrations to be caused by zooming to assign a function of the so-called compensator for correcting a deviation of an image surface caused by zooming to a lens unit to be disposed on the image side of the third lens unit for keeping the third lens unit stationary during zooming. If the third lens unit, on which a strongly diverging light bundle coming from the second lens unit is incident, is configured so as to be movable and have the function of the compensator, large variations of aberrations will be caused by zooming.

The zoom lens system according to the present invention according to the configured seventh embodiment thereof, is characterized in that: the lens system is composed, in order from the object side, of a first lens unit which has a positive refractive power and is to be kept stationary during zooming, a second lens unit which has a negative refractive power and is movable for zooming, a third lens unit which has a positive refractive power and is to be kept stationary during zooming, and a fourth lens unit which has a positive refractive power and is movable for zooming: and a lens element disposed at an image side location in the fourth lens unit is a meniscus lens element which has a concave surface on the image side and a negative refractive power.

For obtaining a compact zoom lens system having high imaging performance, it is desirable to compose a lens system of a first lens unit which has a positive refractive power and is to be kept stationary during zooming, a second lens unit which has a negative refractive power and is movable mainly for changing a focal length of the lens system, and dispose, on the image side of the second lens unit, a third lens unit which has a positive refractive power and is to be kept stationary during zooming and a fourth lens unit which is movable for zooming.

The first lens unit is to be kept stationary during zooming so as to obtain an advantage for shortening a total length of the zoom lens system. Since the first lens unit is composed of lens elements which are heavier than those used for composing any one of the other lens units, configuration of this lens unit as a movable lens unit will inevitably increase a burden imposed on a driving mechanism used with the zoom lens system, thereby being undesirable from the viewpoints of compactness and light weight of the zoom lens system. Further, an attempt made to shorten a total length of the zoom lens system by strengthening refractive powers of the lens units to be disposed on the image side of the second lens unit will make it difficult to correct aberrations, a Petzval's sum and longitudinal chromatic aberration in particular, produced by the fourth lens unit which has an imaging function. The Petzval's sum and longitudinal chromatic aberration can be corrected favorably, and a total length of the lens units to be disposed on the image side of the second lens unit can be shortened by disposing a negative meniscus lens element which has a concave surface on the image side at an image side location in the fourth lens unit as described above.

It is further desirable to configure the fourth lens unit having the composition described above so as to have a function to correct a deviation of an image surface caused by zooming. Since the fourth lens unit is capable of favorably correcting a Petzval's sum and longitudinal chromatic aberration by itself in addition to the fact that the nearly afocal light bundle coming from the third lens unit is incident on the fourth lens unit, it is possible to extremely reduce the variations of aberrations by assigning the function of the compensator to the fourth lens unit.

Accordingly, the seventh composition allows one to obtain a compact zoom lens system which is composed of a smallest possible number of lens units and has high optical performance. A zoom lens system composed of such a small number of lens units is compatible with a lens barrel having a simple structure and provides an advantage for reducing eccentricities of lens units used for composing the zoom lens system. Since it is necessary to dispose lens units with small eccentricities for composing a zoom lens system which has high optical performance in particular, it is desirable to use a small number of lens units for composing a zoom lens system. If five or six lens units are used for composing a zoom lens system, these lens units will inevitably be disposed with large eccentricities, thereby making it difficult to obtain a zoom lens system which has high optical performance. When three lens units are used for composing a zoom lens system, in contrast, it will be difficult to obtain a zoom lens system which has high optical performance.

The zoom lens system according to the present invention configured so as to have an eighth embodiment thereof, is characterized in that: the lens system is composed, in order from the object side, of a first lens unit which has a positive refractive power and is to be kept fixed during zooming, a second lens unit which has a negative refractive power and is movable for zooming, a third lens unit which has a positive refractive power and is to be kept stationary during zooming, and a fourth lens unit which has a positive refractive power and is movable for zooming; the third lens unit comprises at least one positive lens element and at least one negative lens element; the fourth lens unit comprises at least two positive lens elements and at least two negative lens elements; and a negative lens element is disposed at an image side location in the fourth lens unit.

For obtaining a compact zoom lens system which has high optical performance, it is desirable to adopt a first lens unit which has a positive refractive power and is to be kept stationary during zooming, a second lens unit which has a negative refractive power and is movable mainly for changing a focal length of the zoom lens system, a third lens unit which has a positive refractive power and is to be kept stationary during zooming, and a fourth lens unit which is movable for zooming.

In the zoom lens system according to the present invention, the lens units which are disposed on the image side of the second lens unit have compact compositions and refractive powers strengthened for accomplishing the object of the present invention. Accordingly, it is hard to correct a Petzval's sum and longitudinal chromatic aberration produced by the lens unit disposed at the image side location in the zoom lens system. For correcting these aberrations, the fourth lens unit is composed of the negative lens element which is disposed at the image side location so as to have a function to correct a Petzval's sum, and the positive lens elements and the negative lens element which have Abbe's numbers largely different from one another and a positive total refractive power for correcting longitudinal chromatic aberration produced in the fourth lens unit. By composing the fourth lens unit as described above, it is possible to strengthen a refractive power of this lens unit without aggravating a Petzval's sum and longitudinal chromatic aberration. When the fourth lens unit has a strengthened refractive power, however, this lens unit produces negative spherical aberration in a large amount. For correcting this spherical aberration favorably, it is desirable to compose the fourth lens unit of at least two positive lens elements and at least two negative lens elements including a negative lens element to be disposed at an image side location in this lens unit. In other words, it is possible to control mainly longitudinal chromatic aberration in the fourth lens unit by using, for composing this lens unit, a combination of a positive lens element and a negative lens element which have Abbe's numbers largely different from each other and a positive total refractive power, correct a Petzval's sum with a negative lens element disposed at the image side location in the fourth lens unit, and favorably correct positive spherical aberration produced in the fourth lens unit by using at least two positive lens elements.

Further, it is effective for favorable correction of spherical aberration of high orders to dispose a negative lens element having a function for correcting a Petzval's sum at an image side location at which axial rays are low. If this negative lens element is not disposed at the image side location, axial rays will be incident high on this negative lens element, thereby producing spherical aberration of high orders in particular, which can hardly be corrected in the fourth lens unit.

In the zoom lens system according to the present invention, spherical aberration produced by the lens unit disposed at the image side location can be corrected by using an aspherical surface. It is preferable to dispose such an aspherical surface on a lens element other than the negative lens element which is disposed at the image side location.

When the refractive power of the lens unit disposed at the image side location is strengthened, negative spherical aberration is produced in a large amount in particular by a lens element disposed at an object side location at which the axial rays are high in this lens unit. In this lens unit which has the imaging function, however, the axial rays are apt to be low on the negative lens element disposed at the image side location. Accordingly, an aspherical surface must have a large departure from a reference sphere thereof when it is to be disposed on the negative lens element disposed at the image side location for correcting spherical aberration produced by the lens element disposed at the object side location.

On the other hand, offaxial aberrations such as astigmatism are remarkably aggravated by such a large departure from a reference sphere since heights of offaxial rays are higher on the lens element disposed at the image side location than those on the lens element disposed at the object side location. Further, such an aspherical surface having a large departure from a reference sphere thereof is undesirable from viewpoint of manufacturing since it requires a manufacturing allowance, an eccentricity and so on which are extremely small. Accordingly, it is desirable to dispose an aspherical surface on a lens element other than that disposed at the image side location in the zoom lens system according to the present invention.

Moreover, it is desirable to configure the zoom lens system according to the present invention so as to satisfy the following condition (8):

$$0.2 < f_{RW}/f_T < 0.5 \tag{8}$$

wherein the reference symbol $f_{RW}$ represents a total focal length of the lens units which are disposed on the image side of the second lens unit at the wide position and the reference symbol $f_T$ designates a focal length of the zoom lens system as a whole at the tele position.

The condition (8) is required for configuring the zoom lens system according to the present invention to be compact and maintaining high imaging performance thereof over the entire zooming range from the wide position to the tele position. If the upper limit of 0.5 of the condition (8) is exceeded, the lens units disposed on the image side of the second lens unit will have weak refractive powers, thereby making it difficult to shorten a total length of the zoom lens system. If the lower limit of 0.2 of the condition (8) is exceeded, in contrast, the positive lens units disposed on the image side of the second lens unit will have a strengthened positive total refractive power, and produce spherical aberration and a Petzval's sum having large values, whereby large variations of aberrations will be caused by zooming in the zoom lens system as a whole.

For configuring compactly the lens units to be disposed on the image side of the second lens unit in the zoom lens system according to the present invention which has the composition described above, it is desirable to configure the lens system so as to satisfy the following condition (9):

$$0.5 < D_{2W}/f_W < 3.2 \tag{9}$$

wherein the reference symbol $D_{2W}$ represents a distance as measured from an image side surface of the lens element disposed at the image side location to an image surface.

When the distance as measured from the image side surface of the lens element disposed at the image side location in the zoom lens system to the image surface, is extremely long, it is necessary to weaken a refractive power of the third lens unit, thereby making it difficult to shorten a total length of the lens units disposed on the image side of the second lens unit. For preventing the distance as measured from the final surface of the zoom lens system to the image surface from being elongated, the zoom lens system according to the present invention is configured so as to satisfy the condition (9). When the zoom lens system satisfies the condition (9), the lens units disposed on the image side of the second lens unit have compact compositions.

If the upper limit of 3.2 of the condition (9) is exceeded, the lens units disposed on the image side of the second lens unit will have a long total length. If the lower limit of 0.5 of the condition (9) is exceeded, in contrast, it will be difficult to interpose optical elements such as a low pass filter on the object side of the image surface.

For configuring the zoom lens system according to the present invention having the composition described above so as to have high imaging performance by reducing the variations of aberrations to be caused by zooming, it is desirable to configure it so as to satisfy the following condition (10):

$$-0.3 < f_2/f_T < -0.1 \tag{10}$$

If the lower limit of −0.3 of the condition (10) is exceeded, the second lens unit will have a weak refractive power, thereby making it difficult to shorten a total length of the zoom lens system. If the upper limit of −0.1 of the condition (10) is exceeded, the second lens unit will have a strong refractive power, whereby longitudinal chromatic aberration and spherical aberration produced by the second lens unit in particular can hardly be corrected.

For favorably correcting a Petzval's sum produced by the lens unit disposed at the image side location in the zoom lens system according to the present invention, it is desirable to configure the negative lens element to be disposed at the image side location so as to have a refractive power satisfying the following condition (11):

$$-11 < f_e/f_W < -2.5 \tag{11}$$

If the lower limit of −11 of the condition (11) is exceeded, the negative lens element disposed at the image side location will have a weak refractive power, thereby making it difficult to correct a Petzval's sum favorably. If the upper limit of −2.5 of the condition (11) is exceeded, in contrast, the negative lens element disposed at the image side location will have a strong refractive power and overcorrect a Petzval's sum.

Since the zoom lens system according to the present invention has a high vari-focal ratio on the order of 8, it is necessary for configuring the lens system to be compact to strengthen refractive powers of the lens units used for composing the lens system. When refractive powers of the lens units are extremely strengthened, however, these lens units will produce aberrations in large amounts, thereby making it difficult to obtain a zoom lens system having high optical performance. For this reason, it is preferable to configure the first lens unit of the zoom lens system according to the present invention so as to satisfy the condition (12) mentioned below:

$$5 < f_1/f_W < 8.2 \tag{12}$$

If the lower limit of 5 of the condition (12) is exceeded, the first lens unit will have a strong refractive power, thereby making it difficult to correct longitudinal chromatic aberration produced at the tele position in particular. If the upper limit of 8.2 of the condition (12) is exceeded, in contrast, the first lens unit will have a weak refractive power, whereby the zoom lens system will undesirably have a long total length.

When the zoom lens system according to the present invention is to have the composition described above, it is desirable to configure the lens system so as to satisfy the following condition (13):

$$-1.8 < f_2/f_W < -1.1 \tag{13}$$

The condition (13) is required for configuring the zoom lens system according to the present invention so as to have high optical performance by further reducing the variations of aberrations to be caused by zooming.

If the lower limit of −1.8 of the condition (13) is exceeded, the second lens unit will have a weak refractive power and must be moved for a long distance for zooming, thereby increasing the total length of the zoom lens system. If the upper limit of −1.1 of the condition (13) is exceeded, the second lens unit will have a strong negative refractive power, and produce aberrations, a Petzval's sum and positive spherical aberration in particular, in large amounts, whereby remarkable variations of aberrations will undesirably be caused by zooming in the zoom lens system.

For configuring the zoom lens system according to the present invention having the composition described above so as to have more favorable imaging performance, it is desirable to configure the negative lens element to be disposed at the image side location so as to satisfy the following condition (14):

$$-8 < (R_{e2} + R_{e1})/(R_{e2} - R_{e1}) < -2 \tag{14}$$

If the lower limit of −8 of the condition (14) is exceeded, the negative lens element will have a weak refractive power and can hardly correct a Petzval's sum favorably. If the upper limit of −2 of the condition (14) is exceeded, the negative lens element will produce negative spherical aberration and coma in large amounts, thereby making it difficult to obtain a zoom lens system having favorable imaging performance.

For the zoom lens system according to the present invention having the composition described above, it is more desirable to configure the lens units to be disposed on the image side of the second lens unit so as to have a total refractive power satisfying the following condition (15):

$$0.24 < f_{RW}/f_T < 0.35 \tag{15}$$

When the lens units to be disposed on the image side of the second lens unit are configured so as to satisfy the condition (15) mentioned above, these lens units have a short total length while favorably correcting aberrations produced by these lens units.

If the lower limit of 0.24 of the condition (15) is exceeded, the lens units disposed on the image side of the second lens unit will have a strong total refractive power, thereby making it difficult to correct aberrations, spherical aberration in particular, produced by these lens units. If the upper limit of 0.35 of the condition (15) is exceeded, in contrast, the lens units disposed on the image side of the second lens unit will have a weak total refractive power and can hardly have a short total length.

For enhancing optical performance of the zoom lens system according to the present invention, it is necessary to favorably correct chromatic aberration in particular. However, correction of longitudinal chromatic aberration is more difficult at the tele position in particular than that at the wide position since the lens units must have strong refractive powers for composing the zoom lens system according to the present invention which has a high varifocal ratio and a short total length. For correcting this longitudinal chromatic aberration, it is desirable to configure the zoom lens system according to the present invention having the composition described above so as to satisfy the following condition (16):

$$-0.25 < f_2/f_T < -0.16 \tag{16}$$

By configuring the second lens unit so as to have a focal length satisfying the condition (16) which defines a ratio relative to a focal length of the zoom lens system as a whole at the tele position thereof, it is possible to correct longitudinal chromatic aberration produced by the second lens unit.

If the lower limit of −0.25 of the condition (16) is exceeded, the second lens unit will have a weak refractive power, thereby making it difficult to shorten a total length of the zoom lens system. If the upper limit of −0.16 of the condition (16) is exceeded, the second lens unit will have a refractive power which is too strong relatively to the focal length of the zoom lens system as a whole at the tele position thereof, whereby remarkable longitudinal chromatic aberration will be produced at the tele position.

For favorably correcting spherical aberration produced by the lens unit disposed at the image side location in the zoom lens system according to the present invention, it is desirable to configure the lens system so as to satisfy the condition (17):

$$0.7 < R_{o1}/D_{17} < 2.3 \tag{17}$$

If the lower limit of 0.7 of the condition (17) is exceeded, an object side surface of the negative lens element disposed at the image side location will undesirably produce negative spherical aberration and coma in large amounts. If the upper limit of 2.3 of the condition (17) is exceeded, in contrast, the object side surface of the negative lens element disposed at the image side location will produce negative spherical aberration and coma in small amounts, but the lens unit disposed at the image side location will undesirably produce positive spherical aberration and coma in large amount.

For favorably correcting spherical aberration produced by the lens unit disposed at the image side location in the zoom lens system according to the present invention, it is desirable to configure the lens system so as to satisfy the following condition (18):

$$0.5 < R_{o2}/D_{27} < 1.4 \tag{18}$$

If the lower limit of 0.5 of the condition (18) is exceeded, an image side surface of the lens element disposed at the image side location will undesirably produce positive spherical aberration of high orders and coma in large amounts. If the upper limit of 1.4 of the condition (18) is exceeded, in contrast, the image side surface of the lens element disposed at the image side location will produce positive spherical aberration and coma in small amounts, but the lens unit disposed at the image side location will undesirably produce negative spherical aberration and coma in large amounts.

In addition, it is desirable to compose the zoom lens system according to the present invention, in order from the object side, of a first lens unit which has a positive refractive power and is to be kept stationary during zooming, a second lens unit which has a negative refractive power and is movable for zooming, a third lens unit which has a positive refractive power and is to be kept stationary during zooming, and a lens unit or lens units disposed on the image side of the third lens unit. The first lens unit which is to be kept stationary is advantageous for configuring the zoom lens system compactly. Since the first lens unit is heavier than any one of the other lens units, a configuration of the first lens unit as a movable lens unit increases a burden imposed on a driving mechanism used with the zoom lens system, and is undesirable from viewpoints of compactness and light weight of the zoom lens system. The second lens unit is movable and has a function for changing a focal length of the zoom lens system, whereas the third lens unit has the positive refractive power and a function to transform a diverging light bundle coming from the second lens unit into a nearly afocal light bundle which is nearly in parallel with an optical axis. Accordingly, a function of the compensator which corrects a deviation of an image surface caused by zooming is assigned to the lens unit or the lens units disposed on the image side of the third lens unit for keeping the third lens unit stationary during zooming. Since a strongly diverging light bundle coming from the second lens unit is incident on the third lens unit, variations of aberrations will undesirably be large when the third lens unit is configured so as to be movable or selected as the compensator.

It is desirable to focus the zoom lens system which has any one of the compositions described above on an object located at a short distance by moving the lens unit disposed at the image side location toward the object side.

It is necessary for obtaining a zoom lens system having high optical performance to reduce variations caused by focusing.

For reducing variations of aberrations caused by focusing the zoom lens system according to the present invention, it is desirable to focus the lens system by moving the lens unit or the lens units disposed at the image side location toward the object side. Since the nearly afocal light bundle coming from the third lens unit is incident on the lens unit or the lens units disposed at the image side location, the variations of aberrations caused by focusing can be reduced when the lens unit (or the lens units) disposed at the image side location is (or are) moved for focusing the zoom lens system. It is conceivable to focus the zoom lens system by moving the first lens unit for reducing the variations of aberrations caused by focusing. In such a case, however, the first lens unit will undesirably be large since lens elements to be used for composing this lens unit must have diameters large enough for reserving a sufficient amount of offaxial rays at the wide position of the zoom lens system. Further, when a lens unit other than the first lens unit of the single or plural lens units disposed at the image side location is moved for focusing the zoom lens system, the variations of aberrations caused by focusing the zoom lens system will undesirably be large. For the reasons described above, it is desirable to focus the zoom lens system according to the present invention by moving the lens unit or the lens units disposed at the image side location.

Now, numerical data of the preferred embodiments of the zoom lens system according to the present invention will be described below:

Embodiment 1
f = 9.013~25.682~71.705, F/2.0,
2ω = 50.2°~17.5°~6.22°

$r_1 = 65.1572$
  $d_1 = 1.8000$    $n_1 = 1.85504$   $v_1 = 23.78$
$r_2 = 41.7949$
  $d_2 = 5.3000$    $n_2 = 1.60520$   $v_2 = 65.48$
$r_3 = -554.2452$
  $d_3 = 0.1000$
$r_4 = 40.8760$
  $d_4 = 3.8039$    $n_3 = 1.49845$   $v_3 = 81.61$
$r_5 = 120.1971$
  $d_5 = D_1$ (variable)
$r_6 = -817.2662$
  $d_6 = 1.0000$    $n_4 = 1.62032$   $v_4 = 63.39$
$r_7 = 11.8578$
  $d_7 = 4.4098$
$r_8 = -24.1270$
  $d_8 = 1.0000$    $n_5 = 1.62032$   $v_5 = 63.39$
$r_9 = 58.0078$
  $d_9 = 0.2000$
$r_{10} = 24.7087$
  $d_{10} = 2.8000$  $n_6 = 1.84281$   $v_6 = 21.00$
$r_{11} = 72.8448$
  $d_{11} = D_2$ (variable)
$r_{12} = \infty$ (stop)
  $d_{12} = 1.1000$
$r_{13} = 14.9806$ (aspherical surface)
  $d_{13} = 4.2686$  $n_7 = 1.60520$   $v_7 = 65.48$
$r_{14} = -83.2680$
  $d_{14} = 0.8091$  $n_8 = 1.64419$   $v_8 = 34.48$
$r_{15} = 35.0842$
  $d_{15} = D_3$ (variable)
$r_{16} = 30.2694$ (aspherical surface)
  $d_{16} = 2.6080$  $n_9 = 1.65425$   $v_9 = 58.52$
$r_{17} = 261.4063$
  $d_{17} = 0.1000$
$r_{18} = 34.2721$
  $d_{18} = 1.0000$  $n_{10} = 1.74706$  $v_{10} = 27.79$
$r_{19} = 16.0616$
  $d_{19} = 5.2039$  $n_{11} = 1.62032$  $v_{11} = 63.39$
$r_{20} = -28.6026$
  $d_{20} = 0.1000$
$r_{21} = 18.6835$
  $d_{21} = 1.8251$  $n_{12} = 1.63004$  $v_{12} = 35.70$
$r_{22} = 11.5369$ aspherical surface coefficient (13th surface) P = 1.0000, $A_4 = -0.26231 \times 10^{-4}$,
  $A_6 = -0.79602 \times 10^{-7}$, $A_8 = -0.21577 \times 10^{10}$ Embodiment 1
f = 9.013~25.682~71.705, F/2.0,
2ω = 50.2°~17.5°~6.22°

(16th surface) P = 1.0000, $A_4 = -0.64532 \times 10^{-4}$,
  $A_6 = -0.65869 \times 10^{-7}$, $A_8 = -0.13014 \times 10^{-9}$

| f | 9.013 | 25.682 | 71.705 |
|---|---|---|---|
| $D_1$ | 1.5 | 21.4900 | 36.0930 |
| $D_2$ | 36.5422 | 16.5616 | 2.0017 |
| $D_3$ | 9.7755 | 6.5681 | 10.8647 |
| $D_3'$ | 9.688 | 5.956 | 6.262 |

$f_2/f_W = -1.58$, $v_p/v_n = 2.28$, $f_s/f_W = -5.92$
$f_4/f_W = 6.83$, $(R_{a2} + R_{a1})/(R_{a2} - R_{a1}) = -4.23$
$R_{a1}/D_{1T} = 1.21$, $R_{a2}/D_{2T} = 0.85$, $f_{RW}/f_T = 0.28$
$D_{2W}/f_W = 1.64$, $f_2/f_T = -0.20$, $f_3/f_4 = 1.60$

Embodiment 2
f = 8.994~25.562~71.508, F/2.0,
2ω = 51.26°~17.68°~6.62°

$r_1 = 62.7632$
  $d_1 = 1.8000$    $n_1 = 1.85504$   $v_1 = 23.78$
$r_2 = 39.9288$
  $d_2 = 5.3000$    $n_2 = 1.60520$   $v_2 = 65.48$
$r_3 = -342.5121$
  $d_3 = 0.1000$
$r_4 = 36.3601$
  $d_4 = 3.8000$    $n_3 = 1.45720$   $v_3 = 90.31$
$r_5 = 110.0863$
  $d_5 = D_1$ (variable)
$r_6 = 62.3452$
  $d_6 = 1.0000$    $n_4 = 1.62032$   $v_4 = 63.39$
$r_7 = 13.8384$
  $d_7 = 4.4000$
$r_8 = -20.7967$
  $d_8 = 1.0000$    $n_5 = 1.62032$   $v_5 = 63.39$
$r_9 = 16.5809$
  $d_9 = 0.2000$
$r_{10} = 14.0319$ (aspherical surface)
  $d_{10} = 2.4000$  $n_6 = 1.84281$   $v_6 = 21.00$
$r_{11} = 27.1111$ (aspherical surface)
  $d_{11} = D_2$ (variable)
$r_{12} = \infty$ (stop)
  $d_{12} = 1.0000$
$r_{13} = 15.5365$ (aspherical surface)
  $d_{13} = 1.8000$  $n_7 = 1.62032$   $v_7 = 63.39$
$r_{14} = 375.2226$
  $d_{14} = 0.1000$
$r_{15} = 10.9958$
  $d_{15} = 2.8000$  $n_8 = 1.60520$   $v_8 = 65.48$
$r_{16} = 47.2402$
  $d_{16} = 0.9399$
$r_{17} = 87.5857$
  $d_{17} = 0.8000$  $n_9 = 1.65258$   $v_9\text{'} 31.23$
$r_{18} = 8.6354$
  $d_{18} = D_3$ (variable)
$r_{19} = 28.6587$ (aspherical surface)
  $d_{19} = 2.0585$  $n_{10} = 1.65425$  $v_{10} = 58.52$
$r_{20} = 12074.8350$
  $d_{20} = 0.8000$  $n_{11} = 1.63004$  $v_{11} = 35.70$
$r_{21} = 23.7854$
  $d_{21} = 0.1000$
$r_{22} = 14.9214$
  $d_{22} = 5.8256$  $n_{12} = 1.62032$  $v_{12} = 63.39$
$r_{23} = -25.8534$
  $d_{23} = 0.1000$
$r_{24} = 16.5497$
  $d_{24} = 1.8000$  $n_{13} = 1.63004$  $v_{13} = 35.70$
$r_{25} = 11.4178$ aspherical surface coefficient (10th surface) P = 1.0000, $A_4 = -0.73387 \times 10^{-4}$,
  $A_6 = -0.29033 \times 10^{-7}$, $A_8 = 0.57428 \times 10^8$
(11th surface) P = 1.0000, $A_4 = -0.53619 \times 10^{-4}$,

Embodiment 2
f = 8.994~25.562~71.508, F/2.0,
2ω = 51.26°~17.68°~6.62°

$A_6 = 0.13503 \times 10^{-6}$, $A_8 = 0.80688 \times 10^{-8}$
(13th surface) P = 1.0000, $A_4 = -0.22486 \times 10^{-4}$,
$A_6 = -0.42657 \times 10^{-7}$, $A_8 = 0.48546 \times 10^{-9}$
(19th surface) P = 1.0000, $A_4 = -0.10085 \times 10^{-3}$,
$A_6 = -0.22825 \times 10^{-6}$, $A_8 = -0.36735 \times 10^{-8}$

| f | 8.994 | 25.562 | 71.508 |
|---|---|---|---|
| $D_1$ | 1.5 | 19.1760 | 31.9687 |
| $D_2$ | 32.4969 | 14.8189 | 2.0017 |
| $D_3$ | 8.6539 | 5.2209 | 9.4008 |
| $D_3'$ | 8.563 | 4.611 | 4.769 |

$f_2/f_W = -1.39$, $\nu_p/\nu_n = 1.64$, $f_x/f_W = -7.56$
$f_1/f_W = 6.36$, $(R_{e2} + R_{e1})/(R_{e2} - R_{e1}) = -5.45$
$R_{e1}/D_{1T} = 1.57$, $R_{e2}/D_{ZT} = 1.31$, $f_{RW}/f_T = 0.27$
$D_{2W}/f_W = 1.05$, $f_2/f_T = -0.18$, $f_3/f_4 = 1.39$

Embodiment 3
f = 9.064~22.381~53.524, F/2.0,
2ω = 50.38°~20.02°~8.28°

| $r_1 = 57.5850$ | | |
| $d_1 = 1.8000$ | $n_1 = 1.84281$ | $\nu_1 = 21.00$ |
| $r_2 = 38.3498$ | | |
| $d_2 = 5.3000$ | $n_2 = 1.60520$ | $\nu_2 = 65.48$ |
| $r_3 = -281.7420$ | | |
| $d_3 = 0.1000$ | | |
| $r_4 = 32.2623$ | | |
| $d_4 = 3.8008$ | $n_3 = 1.49845$ | $\nu_3 = 81.61$ |
| $r_5 = 81.4762$ | | |
| $d_5 = D_1$ (variable) | | |
| $r_6 = -2087.8956$ | | |
| $d_6 = 1.0000$ | $n_4 = 1.62032$ | $\nu_4 = 63.39$ |
| $r_7 = 11.3242$ | | |
| $d_7 = 4.4098$ | | |
| $r_8 = -18.7185$ | | |
| $d_8 = 1.0000$ | $n_5 = 1.62032$ | $\nu_5 = 63.39$ |
| $r_9 = 50.6768$ | | |
| $d_9 = 0.2000$ | | |
| $r_{10} = 26.2139$ | | |
| $d_{10} = 2.4112$ | $n_6 = 1.84281$ | $\nu_6 = 21.00$ |
| $r_{11} = 111.5478$ | | |
| $d_{11} = D_2$ (variable) | | |
| $r_{12} = \infty$ (stop) | | |
| $d_{12} = 1.0000$ | | |
| $r_{13} = 21.8683$ (aspherical surface) | | |
| $d_{13} = 2.0000$ | $n_7 = 1.64254$ | $\nu_7 = 60.09$ |
| $r_{14} = 55.1948$ | | |
| $d_{14} = 0.1000$ | | |
| $r_{15} = 12.5060$ | | |
| $d_{15} = 2.8104$ | $n_8 = 1.65254$ | $\nu_8 = 60.09$ |
| $r_{16} = -175.4794$ | | |
| $d_{16} = 0.9000$ | $n_9 = 1.63004$ | $\nu_9 = 35.70$ |
| $r_{17} = 13.9236$ | | |
| $d_{17} = D_3$(variable) | | |
| $r_{18} = 24.9577$ (aspherical surface) | | |
| $d_{18} = 3.0000$ | $n_{10} = 1.69979$ | $\nu_{10} = 55.53$ |
| $r_{19} = -18.4983$ | | |
| $d_{19} = 0.8039$ | $n_{11} = 1.67158$ | $\nu_{11} = 33.04$ |
| $r_{20} = 67.7348$ | | |
| $d_{20} = 0.1000$ | | |
| $r_{21} = 17.8726$ | | |
| $d_{21} = 2.2093$ | $n_{12} = 1.65425$ | $\nu_{12} = 58.52$ |
| $r_{22} = -35.6769$ | | |
| $r_{23} = 21.0041$ | | |
| $d_{23} = 1.6200$ | $n_{13} = 1.63004$ | $\nu_{13} = 35.70$ |
| $r_{24} = 9.6502$ | | | aspherical surface coefficient (13th surface) P = 1.0000, $A_4 = -0.29067 \times 10^{-4}$,
$A_6 = -0.78629 \times 10^{-7}$, $A_8 = -0.34758 \times 10^9$
(18th surface) P = 1.0000, $A_4 = -0.10508 \times 10^{-3}$,

Embodiment 3
f = 9.064~22.381~53.524, F/2.0,
2ω = 50.38°~20.02°~8.28°

$A_6 = -0.25859 \times 10^{-6}$, $A_8 = -0.26124 \times 10^{-8}$

| f | 9.064 | 22.381 | 53.524 |
|---|---|---|---|
| $D_1$ | 1.5 | 15.6062 | 26.2099 |
| $D_2$ | 26.6714 | 12.5812 | 2.0017 |
| $D_3$ | 8.3126 | 6.1842 | 9.0885 |
| $D_3'$ | 8.221 | 5.710 | 6.427 |

$f_2/f_W = -1.37$, $\nu_p/\nu_n = 1.68$, $f_x/f_W = -3.31$
$f_1/f_W = 5.54$, $(R_{e2} + R_{e1})/(R_{e2} - R_{e1}) = -2.70$
$R_{e1}/D_{1T} = 1.62$, $R_{e2}/D_{ZT} = 0.85$, $f_{RW}/f_T = 0.32$
$D_{2W}/f_W = 1.34$, $f_2/f_T = -0.23$, $f_3/f_4 = 1.49$

Embodiment 4
f = 9.021~22.133~53.503, F/2.0,
2ω = 51.62°~20.42°~8.32°

| $r_1 = 52.3846$ | | |
| $d_1 = 1.8000$ | $n_1 = 1.84281$ | $\nu_1 = 21.00$ |
| $r_2 = 35.2212$ | | |
| $d_2 = 5.3000$ | $n_2 = 1.60520$ | $\nu_2 = 65.48$ |
| $r_3 = -331.6776$ | | |
| $d_3 = 0.1000$ | | |
| $r_4 = 29.6916$ | | |
| $d_4 = 3.8008$ | $n_3 = 1.43985$ | $\nu_3 = 94.979$ |
| $r_5 = 76.5519$ | | |
| $d_5 = D_1$ (variable) | | |
| $r_6 = 77.7855$ | | |
| $d_6 = 1.0000$ | $n_4 = 1.62032$ | $\nu_4 = 63.39$ |
| $r_7 = 12.7997$ | | |
| $d_7 = 3.8497$ | | |
| $r_8 = -39.1256$ | | |
| $d_8 = 1.0000$ | $n_5 = 1.62032$ | $\nu_5 = 63.39$ |
| $r_9 = 58.6801$ | | |
| $d_9 = 0.2000$ | | |
| $r_{10} = 16.3054$ | | |
| $d_{10} = 2.2005$ | $n_6 = 1.84281$ | $\nu_6 = 21.00$ |
| $r_{11} = 45.4293$ | | |
| $d_{11} = 1.4000$ | | |
| $r_{12} = -22.4548$ | | |
| $d_{12} = 1.0092$ | $n_7 = 1.62032$ | $\nu_7 = 63.39$ |
| $r_{13} = 30.1883$ | | |
| $d_{13} = D_2$ (variable) | | |
| $r_{14} = \infty$ (stop) | | |
| $d_{14} = 1.0000$ | | |
| $r_{15} = 14.3177$ (aspherical surface) | | |
| $d_{15} = 2.0000$ | $n_8 = 1.62032$ | $\nu_8 = 63.39$ |
| $r_{16} = 180.6061$ | | |
| $d_{16} = 0.1000$ | | |
| $r_{17} = 11.6767$ | | |
| $d_{17} = 2.5656$ | $n_9 = 1.64254$ | $\nu_9 = 60.09$ |
| $r_{18} = -53.0273$ | | |
| $d_{18} = 0.9000$ | $n_{10} = 1.63004$ | $\nu_{10} = 35.70$ |
| $r_{19} = 9.1445$ | | |
| $d_{19} = D_3$ (variable) | | |
| $r_{20} = 22.8697$ (aspherical surface) | | |
| $d_{20} = 2.4398$ | $n_{11} = 1.69979$ | $\nu_{11} = 55.53$ |
| $r_{21} = -39.9919$ | | |
| $d_{21} = 0.8017$ | $n_{12} = 1.67158$ | $\nu_{12} = 33.04$ |
| $r_{22} = 30.50000$ | | |
| $d_{22} = 0.1000$ | | |
| $r_{23} = 13.4165$ | | |
| $d_{23} = 3.0355$ | $n_{13} = 1.65425$ | $\nu_{13} = 58.52$ |
| $r_{24} = -27.6806$ | | |
| $d_{24} = 0.1000$ | | |
| $r_{25} = 17.8990$ | | |
| $d_{25} = 1.5019$ | $n_{14} = 1.63004$ | $\nu_{14} = 35.70$ |
| $r_{26} = 8.2800$ | | | aspherical surface coefficient (15th surface) P = 1.0000, $A_4 = -0.43008 \times 10^{-4}$,
$A_6 = -0.84119 \times 10^{-7}$, $A_8 = 0.36356 \times 10^9$, -continued

Embodiment 4
$f = 9.021 \sim 22.133 \sim 53.503$, F/2.0,
$2\omega = 51.62° \sim 20.42° \sim 8.32°$ $A_{10} = 0.10691 \times 10^{-10}$
(20th surface) P = 1.0000, $A_4 = -0.13801 \times 10^{-3}$,
$A_6 = -0.52879 \times 10^{-6}$, $A_8 = -0.12905 \times 10^{-8}$,
$A_{10} = -0.10450 \times 10^{-9}$

| f | 9.021 | 22.133 | 53.503 |
|---|---|---|---|
| $D_1$ | 1.5 | 13.9496 | 23.5866 |
| $D_2$ | 24.1218 | 11.6573 | 2.0011 |
| $D_3$ | 8.0314 | 5.4870 | 7.3615 |
| $D_3'$ | 7.937 | 5.018 | 4.646 |

$f_2/f_W = -1.37$, $v_p/v_n = 1.68$, $f_e/f_W = -2.88$
$f_1/f_W = 5.46$, $(R_{e2} + R_{e1})/(R_{e2} - R_{e1}) = -2.72$
$R_{e1}/D_{1T} = 1.57$, $R_{e2}/D_{2T} = 0.84$, $f_{RW}/f_T = 0.29$
$D_{2W}/f_W = 1.01$, $f_2/f_T = -0.20$, $f_3/f_4 = 1.22$

Embodiment 5
$f = 9.0 \sim 25.585 \sim 71.379$, F/2.8,
$2\omega = 50.56° \sim 17.5° \sim 6.2°$

| | | | |
|---|---|---|---|
| $r_1 = 64.8796$ | | | |
| | $d_1 = 1.8000$ | $n_1 = 1.81265$ | $v_1 = 25.43$ |
| $r_2 = 37.0499$ | | | |
| | $d_2 = 5.3000$ | $n_2 = 1.62032$ | $v_2 = 63.39$ |
| $r_3 = -300.9125$ | | | |
| | $d_3 = 0.1000$ | | |
| $r_4 = 34.1165$ | | | |
| | $d_4 = 3.8000$ | $n_3 = 1.43985$ | $v_3 = 94.97$ |
| $r_5 = 114.5311$ | | | |
| | $d_5 = D_1$ (variable) | | |
| $r_6 = 183.0792$ | | | |
| | $d_6 = 1.0000$ | $n_4 = 1.65425$ | $v_4 = 58.52$ |
| $r_7 = 15.2854$ | | | |
| | $d_7 = 3.5200$ | | |
| $r_8 = -50.4779$ | | | |
| | $d_8 = 1.0000$ | $n_5 = 1.64254$ | $v_5 = 60.09$ |
| $r_9 = 14.8228$ | | | |
| | $d_9 = 0.2000$ | | |
| $r_{10} = 15.3225$ | | | |
| | $d_{10} = 2.2000$ | $n_6 = 1.81265$ | $v_6 = 25.43$ |
| $r_{11} = 136.8865$ | | | |
| | $d_{11} = 2.5000$ | | |
| $r_{12} = -21.5253$ | | | |
| | $d_{12} = 1.1000$ | $n_7 = 1.64254$ | $v_7 = 60.09$ |
| $r_{13} = -270.0894$ | | | |
| | $d_{13} = D_2$ (variable) | | |
| $r_{14} = \infty$ (stop) | | | |
| | $d_{14} = 1.000$ | | |
| $r_{15} = 14.5161$ (aspherical surface) | | | |
| | $d_{15} = 1.8000$ | $n_8 = 1.62032$ | $v_8 = 63.39$ |
| $r_{16} = 30.8071$ | | | |
| | $d_{16} = 0.1000$ | | |
| $r_{17} = 10.7729$ | | | |
| | $d_{17} = 2.1468$ | $n_9 = 1.62032$ | $v_9 = 63.39$ |
| $r_{18} = -81.8844$ | | | |
| | $d_{18} = 0.7390$ | | |
| $r_{19} = 127.6552$ | | | |
| | $d_{19} = 0.8000$ | $n_{10} = 1.67158$ | $v_{10} = 33.04$ |
| $r_{20} = 9.1210$ | | | |
| | $d_{20} = D3$ (variable) | | |
| $r_{21} = 15.1686$ (aspherical surface) | | | |
| | $d_{21} = 1.0000$ | $n_{11} = 1.67766$ | $v_{11} = 32.10$ |
| $r_{22} = 10.3530$ | | | |
| | $d_{22} = 3.7253$ | $n_{12} = 1.62032$ | $v_{12} = 63.39$ |
| $r_{23} = -55.1143$ | | | |
| | $d_{23} = 0.1000$ | | |
| $r_{24} = 10.2309$ | | | |
| | $d_{24} = 1.6700$ | $n_{13} = 1.63004$ | $v_{13} = 35.70$ |
| $r_{25} = 7.7800$ | | | | aspherical surface coefficient
(15th surface) P = 1.0000, $A_4 = -0.73535 \times 10^{-4}$,
$A_6 = -0.37092 \times 10^{-6}$, $A_8 = -0.15315 \times 10^8$

Embodiment 5
$f = 9.0 \sim 25.585 \sim 71.379$, F/2.8,
$2\omega = 50.56° \sim 17.5° \sim 6.2°$ (21st surface) P = 1.0000, $A_4 = -0.66331 \times 10^{-4}$,
$A_6 = -0.26794 \times 10^{-6}$, $A_8 = -0.26836 \times 10^{-8}$

| f | 9.0 | 25.585 | 71.379 |
|---|---|---|---|
| $D_1$ | 1.5 | 17.7038 | 30.1528 |
| $D_2$ | 30.1516 | 13.9482 | 1.5 |
| $D_3$ | 8.1486 | 4.3038 | 8.3022 |
| $D_3'$ | 8.056 | 3.685 | 3.688 |

$f_2/f_W = -1.30$, $v_p/v_n = 1.97$, $f_e/f_W = -7.78$
$f_1/f_W = 6.07$, $(R_{e2} + R_{e1})/(R_{e2} - R_{e1}) = -7.35$
$R_{e1}/D_{1T} = 0.74$, $R_{e2}/D_{2T} = 0.64$, $f_{RW}/f_T = 0.25$
$D_{2W}/f_W = 1.36$, $f_2/f_T = -0.16$, $f_3/f_4 = 1.19$

Embodiment 6
$f = 7.526 \sim 21.129 \sim 59.173$, F/2.0,
$2\omega = 59.6° \sim 21.0° \sim 7.5°$

| | | | |
|---|---|---|---|
| $r_1 = 63.9460$ | | | |
| | $d_1 = 1.8000$ | $n_1 = 1.81265$ | $v_1 = 25.43$ |
| $r_2 = 40.2088$ | | | |
| | $d_2 = 6.2000$ | $n_2 = 1.57098$ | $v_2 = 71.30$ |
| $r_3 = -379.9415$ | | | |
| | $d_3 = 0.1000$ | | |
| $r_4 = 36.8445$ | | | |
| | $d_4 = 4.5000$ | $n_3 = 1.49845$ | $v_3 = 81.61$ |
| $r_5 = 100.7900$ | | | |
| | $d_5 = D_1$ (variable) | | |
| $r_6 = -114.4474$ | | | |
| | $d_6 = 1.0000$ | $n_4 = 1.65425$ | $v_4 = 58.52$ |
| $r_7 = 9.7882$ (aspherical surface) | | | |
| | $d_7 = 4.5000$ | | |
| $r_8 = -17.8771$ | | | |
| | $d_8 = 1.0000$ | $n_5 = 1.62032$ | $v_5 = 63.39$ |
| $r_9 = 685.7622$ | | | |
| | $d_9 = 0.2000$ | | |
| $r_{10} = 30.7715$ | | | |
| | $d_{10} = 2.2008$ | $n_6 = 1.81265$ | $v_6 = 25.43$ |
| $r_{11} = -186.6553$ | | | |
| | $d_{11} = D_2$ (variable) | | |
| $r_{12} = \infty$ (stop) | | | |
| | $d_{12} = 1.1000$ | | |
| $r_{13} = 14.6941$ (aspherical surface) | | | |
| | $d_{13} = 4.1362$ | $n_7 = 1.60520$ | $v_7 = 65.48$ |
| $r_{14} = -58.0487$ | | | |
| | $d_{14} = 0.8000$ | $n_8 = 1.64419$ | $v_8 = 34.48$ |
| $r_{15} = 45.1160$ | | | |
| | $d_{15} = D_3$ (variable) | | |
| $r_{16} = 32.1294$ (aspherical surface) | | | |
| | $d_{16} = 2.6459$ | $n_9 = 1.69979$ | $v_9 = 55.53$ |
| $r_{17} = 725.1398$ | | | |
| | $d_{17} = 0.1000$ | | |
| $r_{18} = 20.6521$ | | | |
| | $d_{18} = 1.0000$ | $n_{10} = 1.74706$ | $v_{10} = 27.79$ |
| $r_{19} = 10.5018$ | | | |
| | $d_{19} = 4.4745$ | $n_{11} = 1.62032$ | $v_{11} = 63.39$ |
| $r_{20} = -34.9547$ | | | |
| | $d_{20} = 0.1000$ | | |
| $r_{21} = 17.9454$ | | | |
| | $d_{21} = 1.6976$ | $n_{12} = 1.61686$ | $v_{12} = 37.00$ |
| $r_{22} = 9.4582$ | | | | aspherical surface coefficient (7th surface) P = 1.0000, $A_4 = -0.37821 \times 10^{-4}$,
$A_6 = -0.44922 \times 10^{-6}$, $A_8 = -0.38608 \times 10^8$
(13th surface) P = 1.000, $A_4 = -0.29497 \times 10^{-4}$,
$A_6 = -0.10035 \times 10^{-6}$, $A_8 = 0.25707 \times 10^{-9}$
(16th surface) P = 1.0000, $A_4 = -0.70324 \times 10^{-4}$,
$A_6 = -0.41355 \times 10^{-7}$, $A_8 = -0.47526 \times 10^{-9}$

| f | 7.526 | 21.129 | 59.173 |
|---|---|---|---|
| $D_1$ | 2.0 | 21.0540 | 34.1201 |

-continued

Embodiment 6
f = 7.526~21.129~59.173, F/2.0,
2ω = 59.6°~21.0°~7.5°

| | | | |
|---|---|---|---|
| $D_2$ | 35.6544 | 16.3279 | 2.0 |
| $D_3$ | 9.2255 | 6.7230 | 9.5306 |
| $D_3'$ | 9.156 | 6.304 | 6.223 |

$f_2/f_W = -1.75$, $\nu_p/\nu_n = 2.28$, $f_c/f_W = -4.66$
$f_1/f_W = 7.92$, $(R_{e2} + R_{e1})/(R_{e2} - R_{e1}) = -3.23$
$R_{e1}/D_{1T} = 1.39$, $R_{e2}/D_{ZT} = 0.65$, $f_{RW}/f_T = 0.31$
$D_{2W}/f_W = 1.55$, $f_2/f_T = -0.22$, $f_3/f_4 = 1.42$

Embodiment 7
f = 8.327~21.9842~50.059, F/2.0,
2ω = 54.26°~20.18°~8.72°

$r_1 = 59.1925$
 $d_1 = 1.6000$   $n_1 = 1.81265$   $\nu_1 = 25.43$
$r_2 = 37.8862$
 $d_2 = 7.0000$   $n_2 = 1.57098$   $\nu_2 = 71.30$
$r_3 = -1441.8160$
 $d_3 = 0.1000$
$r_4 = 38.1099$
 $d_4 = 4.500$   $n_3 = 1.49845$   $\nu_3 = 81.61$
$r_5 = 140.0670$
 $d_5 = D_1$ (variable)
$r_6 = -426.3286$
 $d_6 = 1.0000$   $n_4 = 1.64254$   $\nu_4 = 60.09$
$r_7 = 9.2092$
 $d_7 = 3.8274$
$r_8 = -15.7224$
 $d_8 = 1.0000$   $n_5 = 1.62032$   $\nu_5 = 63.39$
$r_9 = 40.3873$
 $d_9 = 0.2000$
$r_{10} = 21.3029$
 $d_{10} = 2.0000$   $n_6 = 1.85501$   $\nu_6 = 23.88$
$r_{11} = 90.9668$
 $d_{11} = D_2$ (variable)
$r_{12} = \infty$ (stop)
 $d_{12} = 1.1000$
$r_{13} = 13.6889$ (aspherical surface)
 $d_{13} = 3.4472$   $n_7 = 1.65425$   $\nu_7 = 58.52$
$r_{14} = -371.6239$
 $d_{14} = 44.1622$ (aspherical surface)
$r_{15} = 73.5434$
 $d_{15} = D_3$ (variable)
$r_{16} = 44.1622$ (aspherical surface)
 $d_{16} = 2.0157$   $n_9 = 1.69979$   $\nu_9 = 55.53$
$r_{17} = -243.1046$
 $d_{17} = 0.1000$
$r_{18} = 27.5247$
 $d_{18} = 1.0000$   $n_{10} = 1.74706$   $\nu_{10} = 27.79$
$r_{19} = 8.7623$
 $d_{19} = 4.8000$   $n_{11} = 1.62032$   $\nu_{11} = 63.39$
$r_{20} = -27.1700$
 $d_{20} = 0.1000$
$r_{21} = 62.5870$
 $d_{21} = 2.3096$   $n_{12} = 1.65425$   $\nu_{12} = 58.52$
$r_{22} = -59.4417$
 $d_{22} = 0.1000$
$r_{23} = 16.4740$
 $d_{23} = 1.4000$   $n_{13} = 1.60718$   $\nu_{13} = 38.01$
$r_{24} = 8.7940$ aspherical surface coefficient (13th surface) P = 1.0000, $A_4 = -0.55462 \times 10^{-4}$,
 $A_6 = -0.17453 \times 10^{-6}$, $A_8 = -0.41047 \times 10^9$
(16th surface) P = 1.0000, $A_4 = -0.11006 \times 10^{-3}$,
 $A_6 = 0.17398 \times 10^{-6}$, $A_8 = -0.97601 \times 10^{-9}$

| f | 8.327 | 21.984 | 50.059 |
|---|---|---|---|
| $D_1$ | 2.0 | 21.1853 | 34.1279 |
| $D_2$ | 15.1519 | 6.2107 | 2.0 |
| $D_3$ | 6.3164 | 3.5983 | 5.9511 |

-continued

Embodiment 7
f = 8.327~21.9842~50.059, F/2.0,
2ω = 54.26°~20.18°~8.72°

| $D_3'$ | 6.233 | 3.146 | 3.509 |
|---|---|---|---|

$f_2/f_W = -1.19$, $\nu_p/\nu_n = 2.28$, $f_c/f_W = -4.01$
$f_1/f_W = 7.02$, $(R_{e2} + R_{e1})/(R_{e2} - R_{e1}) = -3.29$
$R_{e1}/D_{1T} = 1.56$, $R_{e2}/D_{ZT} = 0.74$, $f_{RW}/f_T = 0.28$
$D_{2W}/f_W = 1.22$, $f_2/f_T = -0.20$, $f_3/f_4 = 1.24$

Embodiment 8
f = 8.499~19.996~50.996, F/2.0,
2ω = 52.7°~22.4°~8.7°

$r_1 = 65.6553$
 $d_1 = 1.6000$   $n_1 = 1.81265$   $\nu_1 = 25.43$
$r_2 = 41.0700$
 $d_2 = 7.0000$   $n_2 = 1.57098$   $\nu_2 = 71.30$
$r_3 = -1277.3716$
 $d_3 = 0.1000$
$r_4 = 36.5344$
 $d_4 = 4.5000$   $n_3 = 1.49845$   $\nu_3 = 81.61$
$r_5 = 125.1930$
 $d_5 = D_1$ (variable)
$r_6 = -793.4739$
 $d_6 = 1.0000$   $n_4 = 1.64254$   $\nu_4 = 60.09$
$r_7 = 10.4763$
 $d_7 = 3.8020$
$r_8 = -22.3664$
 $d_8 = 1.0000$   $n_5 = 1.62032$   $\nu_5 = 63.39$
$r_9 = 42.0247$
 $d_9 = 0.2000$
$r_{10} = 21.8558$
 $d_{10} = 2.0000$   $n_6 = 1.85501$   $\nu_6 = 23.88$
$r_{11} = 97.0316$
 $d_{11} = D_2$ (variable)
$r_{12} = \infty$ (stop)
 $d_{12} = 1.0000$
$r_{13} = 14.0128$ (aspherical surface)
 $d_{13} = 3.3405$   $n_7 = 1.65425$   $\nu_7 = 58.52$
$r_{14} = -44.3413$
 $d_{14} = 0.8000$   $n_8 = 1.64419$   $\nu_8 = 34.48$
$r_{15} = 38.3026$
 $d_{15} = D_3$ (variable)
$r_{16} = 48.4359$ (aspherical surface)
 $d_{16} = 2.0000$   $n_9 = 1.69979$   $\nu_9 = 55.53$
$r_{17} = 48235.7467$
 $d_{17} = 0.1000$
$r_{18} = 23.3756$
 $d_{18} = 1.0000$   $n_{10} = 1.74706$   $\nu_{10} = 27.79$
$r_{19} = 10.6871$
 $d_{19} = 4.8000$   $n_{11} = 1.62032$   $\nu_{11} = 63.39$
$r_{20} = -24.8252$
 $d_{20} = 0.1000$
$r_{21} = 69.4731$
 $d_{21} = 2.0524$   $n_{12} = 1.69979$   $\nu_{12} = 55.53$
$r_{22} = -66.3076$
 $d_{22} = 0.1000$
$r_{23} = 20.3020$
 $d_{23}3' 1.4000$   $n_{13} = 1.60718$   $\nu_{13} = 38.01$
$r_{24} = 8.6006$ aspherical surface coefficient (13th surface) P = 1.0000, $A_4 = -0.35835 \times 10^{-4}$,
 $A_6 = -0.12710 \times 10^{-6}$, $A_8 = -0.79115 \times 10^9$
(16th surface) P = 1.0000, $A_4 = -0.12087 \times 10^{-3}$,
 $A_6 = -0.52495 \times 10^{-7}$, $A_8 = -0.31805 \times 10^{-9}$

| f | 8.499 | 19.996 | 50.996 |
|---|---|---|---|
| $D_1$ | 2.0 | 11.7826 | 34.2599 |
| $D_2$ | 24.2970 | 6.0932 | 2.0 |
| $D_3$ | 8.0125 | 3.9138 | 6.7193 |
| $D_3'$ | 7.926 | 3.526 | 4.241 |

$f_2/f_W = -1.548$, $\nu_p/\nu_n = 2.28$, $f_c/f_W = -3.029$

-continued

Embodiment 8
f = 8.499~19.996~50.996, F/2.0,
2ω = 52.7°~22.4°~8.7°

$f_1/f_W = 7.13$, $(R_{e2} + R_{e1})/(R_{e2} - R_{e1}) = -2.47$
$R_{e1}/D_{1T} = 2.06$, $R_{e2}/D_{ZT} = 0.76$, $f_{RW}/f_T = 0.31$
$D_{2W}/f_W = 1.19$, $f_2/f_T = -0.26$, $f_3/f_4 = 1.48$

Embodiment 9
f = 9.0~21.0~72.01, F/2.0,
2ω = 50.84°~21.58°~6.28°

| | | | |
|---|---|---|---|
| $r_1 = 64.6954$ | | | |
| | $d_1 = 1.8000$ | $n_1 = 1.85504$ | $v_1 = 23.78$ |
| $r_2 = 42.2084$ | | | |
| | $d_2 = 5.5000$ | $n_2 = 1.57098$ | $v_2 = 71.30$ |
| $r_3 = -280.6037$ | | | |
| | $d_3 = 0.1000$ | | |
| $r_4 = 34.9796$ | | | |
| | $d_4 = 3.8403$ | $n_3 = 1.49845$ | $v_3 = 81.61$ |
| $r_5 = 84.5985$ | | | |
| | $d_5 = D_1$ (variable) | | |
| $r_6 = 248.1660$ | | | |
| | $d_6 = 1.0000$ | $n_4 = 1.57098$ | $v_4 = 71.30$ |
| $r_7 = 13.0068$ | | | |
| | $d_7 = 7.4745$ | | |
| $r_8 = -20.2922$ | | | |
| | $d_8 = 1.0000$ | $n_5 = 1.62032$ | $v_5 = 63.39$ |
| $r_9 = 22.8649$ | | | |
| | $d_9 = 0.2000$ | | |
| $r_{10} = 20.8259$ | | | |
| | $d_{10} = 2.8000$ | $n_6 = 1.84281$ | $v_6 = 21.00$ |
| $r_{11} = 54.3326$ | | | |
| | $d_{11} = D_2$ (variable) | | |
| $r_{12} = \infty$ (stop) | | | |
| | $d_{12} = 1.1000$ | | |
| $r_{13} = 17.7996$ (aspherical surface) | | | |
| | $d_{13} = 5.4995$ | $n_7 = 1.57098$ | $v_7 = 71.30$ |
| $r_{14} = -49.6021$ | | | |
| | $d_{14} = 0.6000$ | | |
| $r_{15} = 169.8839$ | | | |
| | $d_{15} = 0.9000$ | $n_8 = 1.65258$ | $v_8 = 31.23$ |
| $r_{16} = 31.3011$ | | | |
| | $d_{16} = D_3$ (variable) | | |
| $r_{17} = 22.1068$ (aspherical surface) | | | |
| | $d_{17} = 3.2000$ | $n_9 = 1.65425$ | $v_9 = 58.52$ |
| $r_{18} = -73.2740$ | | | |
| | $d_{18} = 1.0000$ | | |
| $r_{19} = -1818.4423$ | | | |
| | $d_{19} = 1.0000$ | $n_{10} = 1.74706$ | $v_{10} = 27.79$ |
| $r_{20} = 27.5781$ | | | |
| | $d_{20} = 0.5000$ | | |
| $r_{21} = 21.6927$ | | | |
| | $d_{21} = 4.7382$ | $n_{11} = 1.57098$ | $v_{11} = 71.30$ |
| $r_{22} = -38.8085$ | | | |
| | $d_{22} = 0.1000$ | | |
| $r_{23} = 18.8198$ | | | |
| | $d_{23} = 1.8500$ | $n_{12} = 1.63004$ | $v_{12} = 35.70$ |
| $r_{24} = 11.5212$ | | | | aspherical surface coefficient (13th surface) P = 1.0000, $A_4 = -0.31464 \times 10^{-4}$,
$A_6 = -0.67673 \times 10^{-7}$, $A_8 = -0.34952 \times 10^{-10}$
(17th surface) P = 1.0000, $A_4 = -0.46831 \times 10^{-4}$,
$A_6 = -0.57996 \times 10^{-7}$, $A_8 = -0.10817 \times 10^{-9}$

| f | 9 | 21 | 72.01 |
|---|---|---|---|
| $D_1$ | 1.5 | 16.8044 | 32.0733 |
| $D_2$ | 32.6041 | 17.2999 | 2.0 |
| $D_3$ | 14.2571 | 10.2962 | 10.7565 |
| $D_3'$ | 14.1731 | 10.2522 | 6.0955 |

$f_2/f_W = -1.30$, $v_p/v_n = 2.28$, $f_e/f_W = -5.81$
$f_1/f_W = 6.57$, $(R_{e2} + R_{e1})/(R_{e2} - R_{e1}) = -4.16$

-continued

Embodiment 9
f = 9.0~21.0~72.01, F/2.0,
2ω = 50.84°~21.58°~6.28°

$R_{e1}/D_{1T} = 1.03$, $R_{e2}/D_{ZT} = 0.70$, $f_{RW}/f_T = 0.31$
$D_{2W}/f_W = 1.44$, $f_2/f_T = -0.198$, $f_3/f_4 = 1.29$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements for the e-line, and the reference symbols $v_1, v_2, \ldots$ represent Abbe's numbers of the respective lens elements.

A first embodiment of the zoom lens system according to the present invention has a composition illustrated in FIG. 1, wherein the lens system consists of a first lens unit $G_1$ which is to be kept stationary during zooming and has a positive refractive power, a second lens unit $G_2$ which has a negative refractive power and is to be moved in two directions along an optical axis during zooming for changing a focal length of the zoom lens system, a third lens unit $G_3$ which is to be kept stationary during zooming and has a positive refractive power, and a fourth lens unit $G_4$ which has a positive refractive power and is movable during zooming for correcting a deviation of an image surface caused by changing the focal length of the zoom lens system. Locations of the lens elements at a wide position, an intermediate focal length and a tele position of the zoom lens system are illustrated at an upper stage, a middle stage and a lower stage respectively in FIG. 1.

The lens units used in the first embodiment have compositions described below:

The first lens unit $G_1$ consists, in order from the object side, of a negative lens element, a positive lens element and a positive lens element, and has a function to narrow a light bundle coming from an axial object point and another function to lead a light bundle to the second lens unit $G_2$.

The second lens unit $G_2$ consists, in order from the object side, of a negative lens element, a negative lens element and a positive lens element, and is moved from the object side to the image side for changing a focal length of the zoom lens system when it is zoomed from the wide position to the tele position.

The third lens unit $G_3$ consists, in order from the object side, of a positive lens element and a negative lens element, is to be kept stationary during zooming, and has a function to transform a diverging light bundle coming from the second lens unit $G_2$ into a nearly afocal light bundle.

The fourth lens unit $G_4$ consists, in order from the object side, of a positive lens element, a cemented lens component composed of a negative lens element and a positive lens element, and a negative lens element, and is movable during zooming for correcting a deviation of the image surface caused by zooming.

In the zoom lens system preferred as the first embodiment, a Petzval's sum is corrected favorably by the negative lens element disposed at an image side location in the fourth lens unit $G_4$ and chromatic aberration produced by the fourth lens unit $G_4$ is corrected favorably by the cemented lens component disposed on the object side of the negative lens element.

In the zoom lens system preferred as the first embodiment, an object side surface of the lens element disposed at an object side location in the third lens unit and an object side surface of the lens element disposed at an object side location in the fourth lens unit are configured as aspherical surfaces which weaken positive refractive powers as portions of the aspherical surface are further from the optical axis for favorably correcting spherical aberration which is produced mainly by the lens units.

Generally speaking, a Petzval's sum and chromatic aberration can be corrected only within a certain limited range by using combinations of glass materials currently available as optical glass materials. In the first embodiment of the present invention, chromatic aberration is corrected favorably by using a combination of two glass materials having Abbe's numbers which are large as described below. The negative lens elements are made of a glass material which has a refractive index n of 1.74077 and an Abbe's number ν of 27.79, whereas the positive lens elements are made of a glass material which has a refractive index n of 1.61800 and an Abbe's number ν of 63.38.

In the first embodiment of the present invention, the negative lens element disposed at the image side location in the fourth lens unit $G_4$ favorably corrects a Petzval's sum produced mainly by this lens unit. This negative lens element is disposed at the image side location at which axial rays are low and has a meniscus shape which has a concave surface on the image side for correcting the Petzval's sum favorably without aggravating spherical aberration or coma.

The zoom lens system preferred as the first embodiment is focused on an object located at an extremely short distance by moving the fourth lens unit toward the object side.

Figure 2:
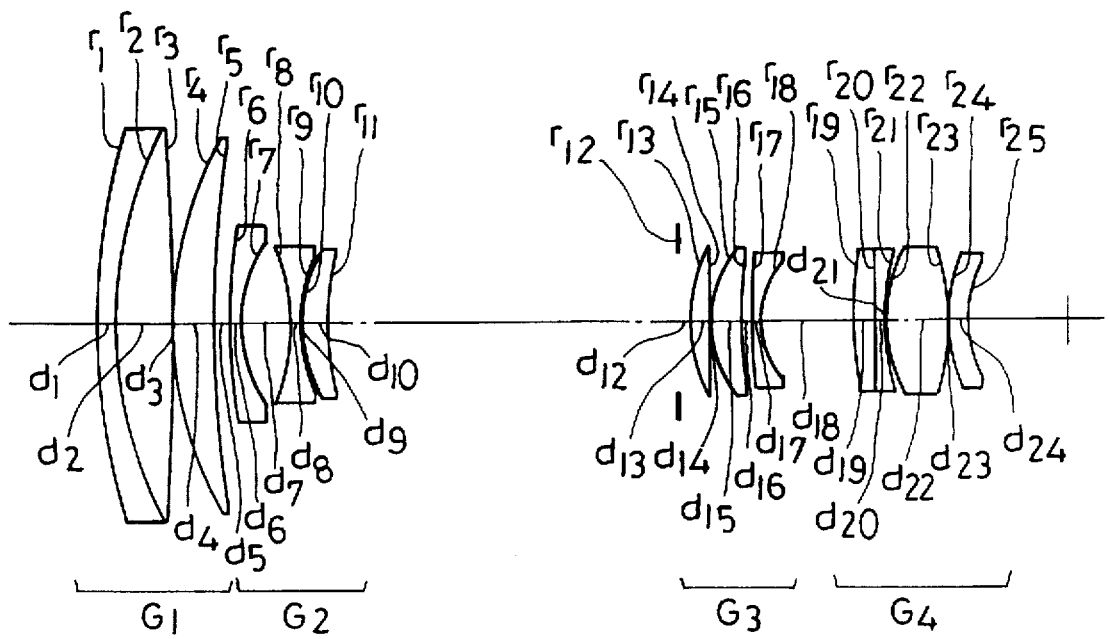
FIG. 2 is a sectional view illustrating the second embodiment of the zoom lens system according to the present invention.

A second embodiment of the zoom lens system according to the present invention has a composition illustrated in FIG. 2, wherein the lens system consists, in order from the object side, of a first lens unit $G_1$ which is to be kept stationary during zooming and has a positive refractive power, a second lens unit $G_2$ which has a negative refractive power and is to be moved in two directions along an optical axis during zooming for changing a focal length of the zoom lens system, a third lens unit $G_3$ which is to be kept stationary during zooming and has a positive refractive power, and a fourth lens unit $G_4$ which has a positive refractive power and is movable during zooming for correcting a deviation of an image surface caused by changing the focal length.

The first lens unit $G_1$ is composed, in order from the object side, of a negative lens element, a positive lens element and a positive lens element; the second lens unit $G_2$ is composed, in order from the object side, of a negative lens element, a negative lens element and a positive lens element; the third lens unit $G_3$ is composed, in order from the object side, of a positive lens element, a positive lens element and a negative lens element; and the fourth lens unit $G_4$ is composed, in order from the object side, of a positive lens element, a negative lens element, a positive lens element and a negative lens element. These lens units have functions which are substantially the same as those of the lens units used in the first embodiment.

The zoom lens system preferred as the second embodiment has a total length approximately 0.9 times as long as that of the first embodiment, but has high optical performance owing to the fact that the second embodiment is configured so as to satisfy the conditions adopted for configuration thereof. In the second embodiment, an object side surface of the lens element disposed at an object side location in the third lens unit $G_3$ is an aspherical surface which weakens a positive refractive power as portions of the aspherical surface are farther from the optical axis toward a margin thereof for favorably correcting negative spherical aberration produced by the third lens unit. Further, an object side surface of the lens element disposed at an object side location in the fourth lens unit $G_4$ is an aspherical surface which weakens a positive refractive power as portions of the aspherical surface are farther from the optical axis for favorably correcting negative spherical aberration produced by the fourth lens unit $G_4$.

For shortening a total length of a zoom lens system while maintaining high imaging performance thereof, it is desirable to select an adequate value for a distance $D_{2W}$ as measured from an image side surface of a lens element disposed at an image side location in the zoom lens system to an image surface thereof. For this purpose, the second embodiment is configured so as to satisfy the following condition (19):

$$0.9 < D_{2W}/f_W < 2.3 \qquad (19)$$

If the lower limit of 0.9 of the condition (19) is exceeded, it will be difficult to dispose a low pass filter or the similar optical element on the object side of the image surface. If the upper limit of 2.3 of the condition (19) is exceeded, in contrast, the lens units disposed on the image side of the second lens unit (i.e., the third lens unit and the fourth lens unit) will have a long total length.

Figure 3:
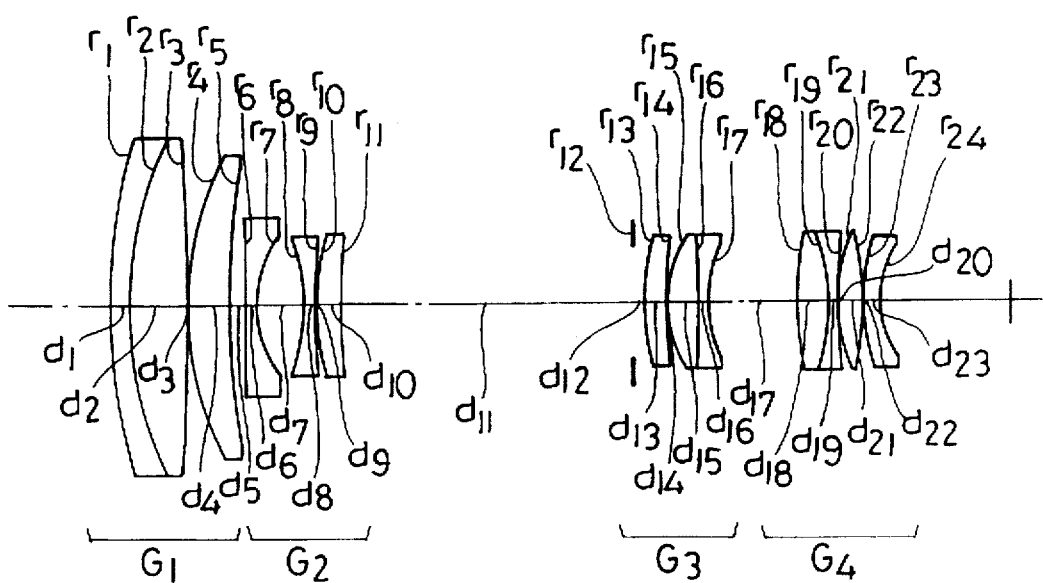
FIG. 3 is a sectional view illustrating the third embodiment of the zoom lens system according to the present invention.

A third embodiment of the zoom lens system according to the present invention has a composition illustrated in FIG. 3, wherein the lens system is composed of a first lens unit $G_1$, which is to be kept stationary during zooming and has a positive refractive power, a second lens unit $G_2$, which has a negative refractive power and is to be moved in two directions along an optical axis during zooming for changing a focal length of the zoom lens system, a third lens unit $G_3$, which is to be kept stationary during zooming and has a positive refractive power, and a fourth lens unit $G_4$ which has a positive refractive power and is movable during zooming for correcting a deviation of an image surface caused by changing the focal length.

The first lens unit $G_1$ consists, in order from the object side, of a negative lens element, a positive lens element and a positive lens element; the second lens unit $G_2$ consists, in order from the object side, of a negative lens element, a negative lens element and a positive lens element; the third lens unit $G_3$ consists, in order from the object side, of a positive lens element, a positive lens element and a negative lens element; and the fourth lens unit $G_4$ consists, in order from the object side, of a positive lens element, a negative lens element, a positive lens element and a negative lens element. The lens units used for composing the third embodiment have functions which are substantially the same as those of the lens units adopted in the first embodiment.

Further, an object side surface of the lens element disposed at an object side location in the third lens unit is an aspherical surface which weakens a positive refractive power as portions of the aspherical surface are farther from the optical axis toward a margin thereof for favorably correcting negative spherical aberration produced by the third lens unit $G_3$. Furthermore, an object side surface of the lens element disposed at an object side location in the fourth lens unit $G_4$ is configured as an aspherical surface which weakens a positive refractive power as portions of the aspherical surface are farther from the optical axis toward a margin thereof for favorably correcting negative spherical aberration produced by the fourth lens unit $G_4$.

When a third lens unit having a positive refractive power and a fourth lens unit having a positive refractive power are to be disposed on the image side of a second lens unit $G_2$ as in the third embodiment of the present invention, it is desirable to configure these lens units so as to have refractive powers satisfying the following condition (20):

$1.1 < f_3/f_4 < 2$  (20)

wherein the reference symbols $f_3$ and $f_4$ represent focal lengths of the third lens unit and the fourth lens unit respectively.

By configuring the third lens unit and the fourth lens unit so as to satisfy the condition (20), it is possible to shorten the total length of these lens units while favorably correcting aberrations produced by these lens units. If the lower limit of 1.1 of the condition (20) is exceeded, the fourth lens unit $G_4$ will have a refractive power which is strong relatively to that of the third lens unit $G_3$, and undesirably produce longitudinal chromatic aberration and a Petzval's sum in large amounts. If the upper limit of 2 of the condition (20) is exceeded, in contrast, the third lens unit $G_3$ will have a strong refractive power and undesirably produce spherical aberration in a large amount.

Figure 4:
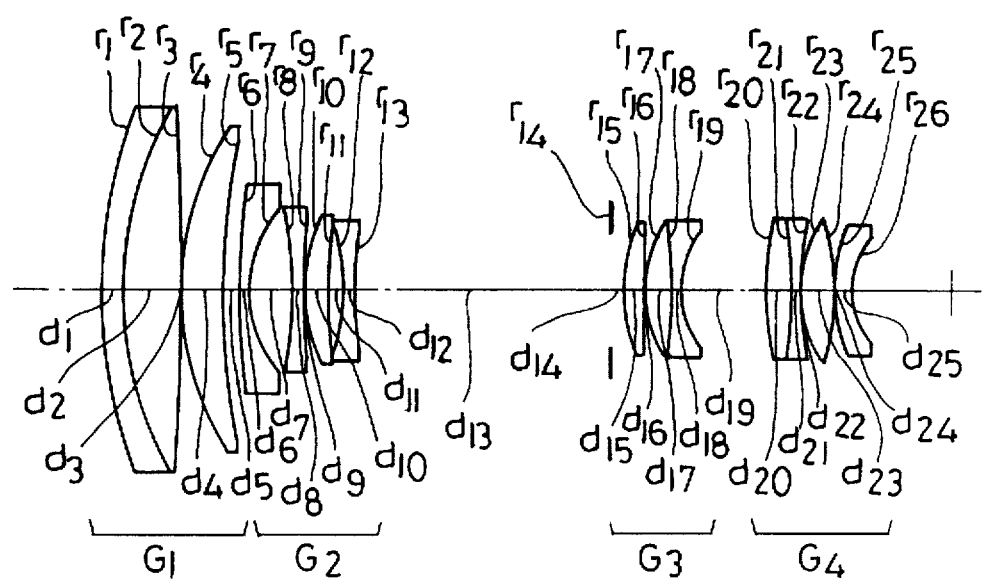
FIG. 4 is a sectional view illustrating the fourth embodiment of the zoom lens system according to the present invention.

A fourth embodiment of the zoom lens system according to the present invention has a composition illustrated in FIG. 4, wherein the lens system consists of a first lens unit $G_1$ which is to be kept stationary during zooming and has a positive refractive power, a second lens unit $G_2$ which has a negative refractive power and is moved along an optical axis during zooming for changing a focal length of the zoom lens system, a third lens unit $G_3$ which is kept stationary during zooming and has a positive refractive power, and a fourth lens unit $G_4$ which has a positive refractive power and is movable during zooming for correcting a deviation of an image surface caused by changing the focal length.

The first lens unit $G_1$ is composed, in order from the object side, of a negative lens element, a positive lens element and a positive lens element; the second lens unit $G_2$ is composed, in order from the object side, of a negative lens element, a negative lens element, a positive lens element and a positive lens element; the third lens unit $G_3$ is composed, in order from the object side, of a positive lens element, a positive lens element and a negative lens element; and the fourth lens unit $G_4$ is composed, in order from the object side, of a positive lens element, a negative lens element, a positive lens element and a negative lens element. Functions of these lens units are substantially the same as those of the lens units used in the first embodiment of the present invention.

An object side surface of the lens element disposed at an object side location in the third lens unit $G_3$ is configured as an aspherical surface which weakens a positive refractive power as portions of the aspherical surface are farther from the optical axis toward a margin thereof. Further, an object side surface of the lens element disposed at an object side location in the fourth lens unit $G_4$ is also configured as an aspherical surface which weakens a positive refractive power as portions of the aspherical surface are farther from the optical axis toward a margin thereof for favorably correcting negative spherical aberration produced by the fourth lens unit $G_4$.

In the fourth embodiment, the second lens unit $G_2$ has a refractive power which is stronger than that of the second lens unit used in the third embodiment, whereby the second lens unit $G_2$ of the fourth embodiment is moved for a shorter distance for zooming and the fourth embodiment has a total length shorter than that of the third embodiment. The second lens unit $G_2$ is composed of the four lens elements, i.e., the negative lens element, the negative lens element, the positive lens element and the negative lens element, for favorably correcting aberrations, longitudinal chromatic aberration in particular, produced by the second lens unit $G_2$.

Figure 5:
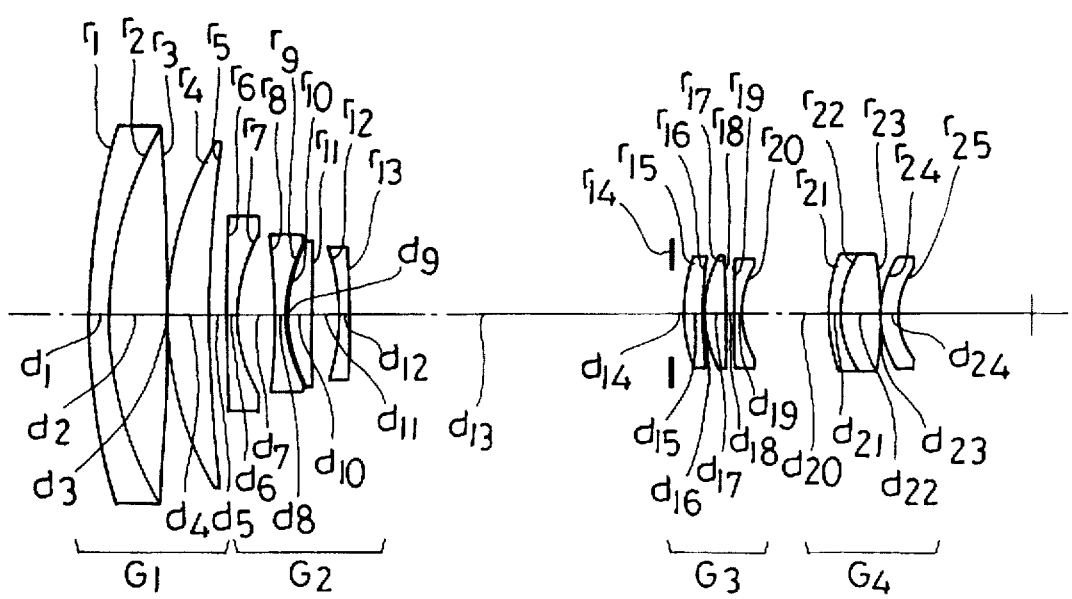
FIG. 5 is a sectional view illustrating the fifth embodiment of the zoom lens system according to the present invention.

A fifth embodiment of the zoom lens system according to the present invention has a composition shown in FIG. 5, wherein the lens system is composed of a first lens unit $G_1$ which is kept stationary during zooming and has a positive refractive power, a second lens unit $G_2$ which has a negative refractive power and is moved in two directions along an optical axis during zooming for changing a focal length of the zoom lens system, a third lens unit $G_3$ which is kept stationary during zooming and has a positive refractive power, and a fourth lens unit $G_4$ which has a positive refractive power and is movable during zooming for correcting a deviation of an image surface caused by changing the focal length.

The first lens unit $G_1$ consists, in order from the object side, of a negative lens element, a positive lens element and a positive lens element; the second lens unit $G_2$ consists, in order from the object side, of a negative lens element, a negative lens element, a positive lens element and a negative lens element; the third lens unit $G_3$ consists, in order from the object side, of a positive lens element, a positive lens element and a negative lens element; and the fourth lens unit $G_4$ consists, in order from the object side, of a negative lens element, a positive lens element and a negative lens element. These lens units have functions which are substantially the same as those of the lens units used in the first embodiment.

Figure 6:
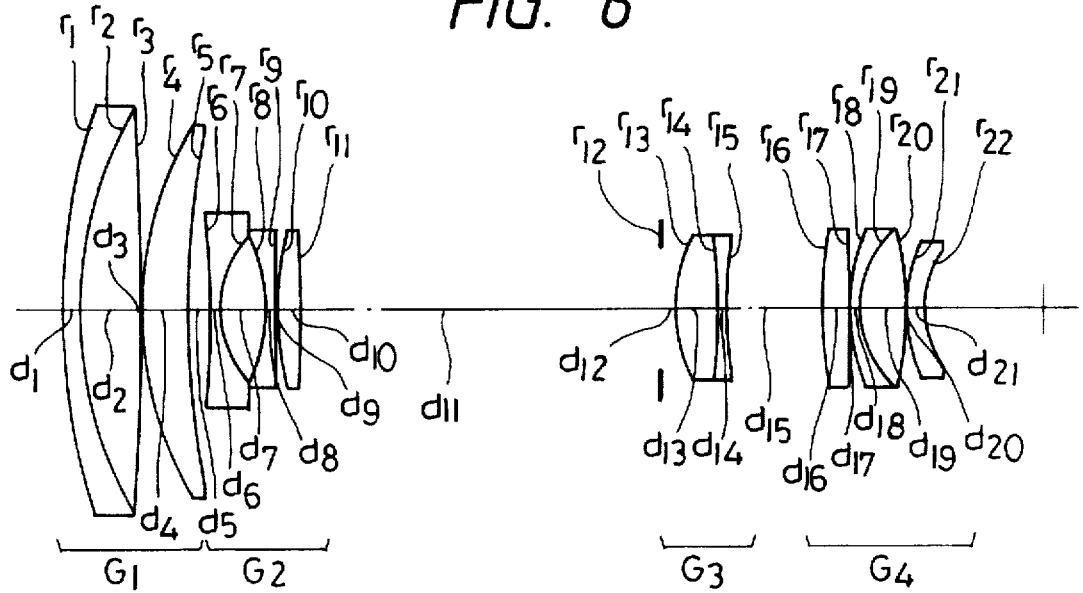
FIG. 6 is a sectional view illustrating the sixth embodiment of the zoom lens system according to the present invention.

A sixth embodiment of the zoom lens system according to the present invention has a composition shown in FIG. 6, wherein the lens system is composed of a first lens unit $G_1$ which is kept stationary during zooming and has a positive refractive power, a second lens unit $G_2$ which has a negative refractive power and is moved in two directions along an optical axis during zooming mainly for changing a focal length of the zoom lens system, a third lens unit $G_3$ which has a positive refractive power and is moved in the two directions along the optical axis during zooming mainly for changing the focal length of the zoom lens system in cooperation with the second lens unit, and a fourth lens unit $G_4$ which has a positive refractive power and is movable during zooming mainly for correcting a deviation of an image surface caused by changing the focal length.

The first lens unit $G_1$ consists, in order from the object side, of a negative lens element, a positive lens element and a positive lens element; the second lens unit $G_2$ consists, in order from the object side, of a negative lens element and a positive lens element; the third lens unit $G_3$ consists, in order from the object side, of a positive lens element and a negative lens element; and the fourth lens unit $G_4$ consists, in order from the object side, of a positive lens element, a negative lens element, a positive lens element and negative lens element.

In the sixth embodiment, a function to change the focal length of the zoom lens system is shared between the second lens unit $G_2$ and the third lens unit $G_3$ so that the second lens unit $G_2$ has a weak refractive power and produces aberrations in small amounts, thereby reducing the variations of aberrations in the zoom caused by zooming the lens system.

In the sixth embodiment, negative distortion produced at the wide position in particular is corrected by configuring an image side surface of the lens element disposed at an object side location in the second lens unit $G_2$ so as to have an aspherical surface which weakens a negative refractive power as portions of the aspherical surface are farther from the optical axis toward a margin thereof. Further, an object side surface of the lens element disposed at an object side location in the third lens unit $G_3$ and an object side surface of the lens element disposed at an object side location in the fourth lens unit $G_4$ are configured so as to have aspherical surfaces which weaken positive refractive powers as portions of the aspherical surfaces are farther from the optical axis toward margins thereof for correcting spherical aberration produced mainly by these lens units.

Figure 7:
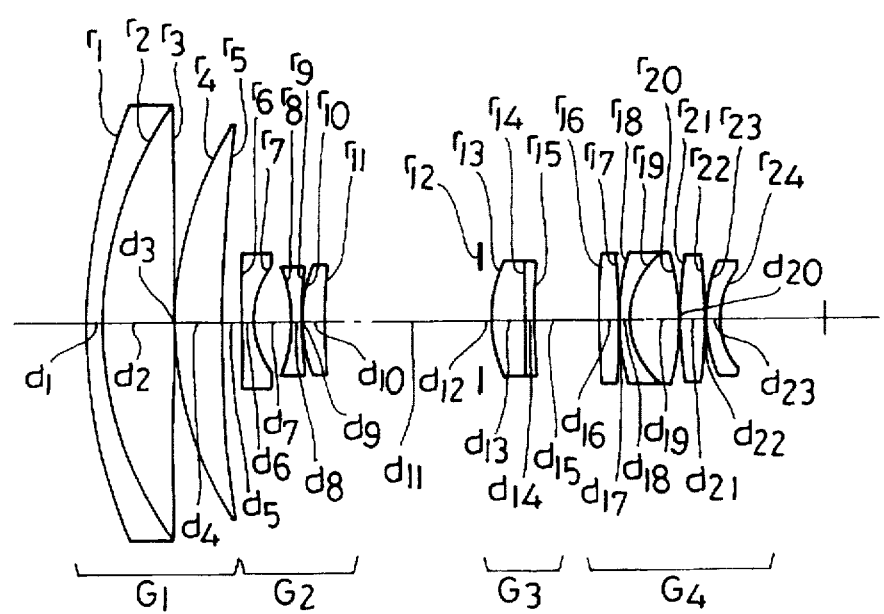
FIG. 7 is a sectional view illustrating the seventh embodiment of the zoom lens system according to the present invention.

A seventh embodiment of the zoom lens system according to the present invention has a composition illustrated in FIG. 7, wherein the lens system consists of a first lens unit $G_1$ which has a positive refractive power and is moved in two directions along an optical axis during zooming for changing a focal length of the zoom lens system, a second lens unit $G_2$ which has a negative refractive power and is moved in the two directions along the optical axis during zooming for changing the focal length of the zoom lens system in cooperation with the first lens unit $G_1$, a third lens unit $G_3$ which has a positive refractive power and is to be kept stationary during zooming and a fourth lens unit $G_4$ which has a positive refractive power and is movable during zooming mainly for correcting a deviation of an image surface caused by zooming the lens system.

The first lens unit $G_1$ is composed, in order from the object side, of a negative lens element, a positive lens element and a positive lens element; the second lens unit $G_2$ is composed, in order from the object side, of a negative lens element and a positive lens element; the third lens unit $G_3$ is composed, in order from the object side, of a positive lens element and a negative lens element; and the fourth lens unit $G_4$ is composed, in order from the object side, of a positive lens element, a negative lens element, a positive lens element and a positive lens element.

In the seventh embodiment, a function to change the focal length of the zoom lens system is shared between the first lens unit $G_1$ and the second lens unit $G_2$ so that these lens units have weak refractive powers, thereby reducing the variations of aberrations to be caused by zooming the lens system.

In the seventh embodiment, an object side surface of the lens element disposed at an object side location in the third lens unit $G_3$ and an object side surface of the lens element disposed at an object side location in the fourth lens unit $G_4$ are configured so as to have aspherical shapes which weaken positive refractive powers as portions of the aspherical surfaces are farther from the optical axis toward margins thereof for correcting mainly spherical aberration produced by these lens units.

Figure 8:
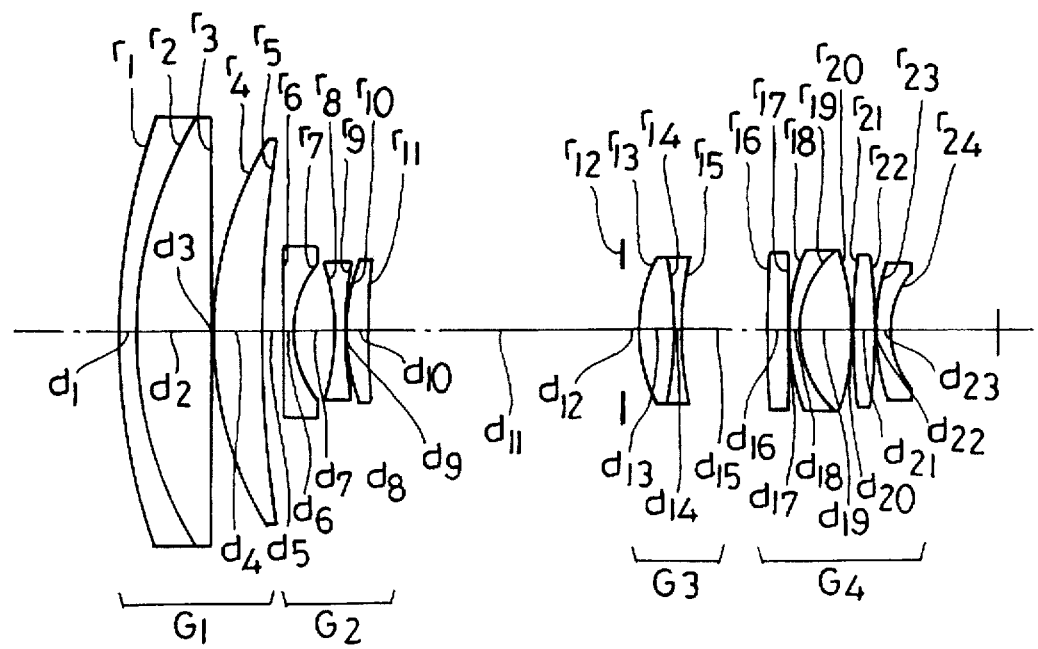
FIG. 8 is a sectional view illustrating the eighth embodiment of the zoom lens system according to the present invention.

An eighth embodiment of the zoom lens system according to the present invention has a composition shown in FIG. 8, wherein the lens system is composed of a first lens unit $G_1$ which has a positive refractive power and is movable for zooming, a second lens unit $G_2$ which has a negative refractive power and is moved in two directions along an optical axis during zooming for changing a focal length of the zoom lens system, a third lens unit $G_3$ which has a positive refractive power and is movable for zooming, and a fourth lens unit $G_4$ which has a positive refractive power and is movable during zooming mainly for correcting a deviation of an image surface caused by changing the focal length.

The first lens unit $G_1$ consists, in order from the object side, of a negative lens element, a positive lens element and a positive lens element; the second lens unit $G_2$ consists, in order from the object side, of a negative lens element, a negative lens element and a positive lens element; the third lens unit $G_3$ consists, in order from the object side, of a positive lens element and a negative lens element; and the fourth lens unit $G_4$ consists, in order from the object side, of a positive lens element, a negative lens element, a positive lens element, a positive lens element and a negative lens element.

In the eighth embodiment, an object side surface of the lens element disposed at an object side location in the third lens unit $G_3$ and an object side surface of the lens element disposed at an object side location in the fourth lens unit $G_4$ are configured so as to have aspherical shapes which weaken positive refractive powers as portions of the aspherical surfaces are farther from the optical axis toward margins thereof for favorably correcting spherical aberration produced mainly by these lens units.

Figure 9:
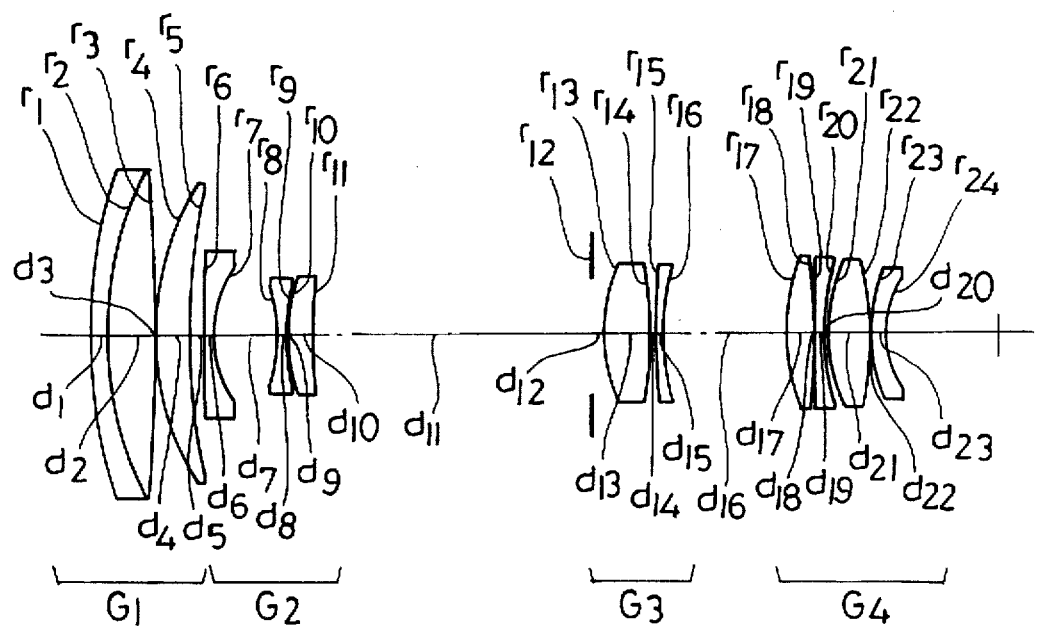
FIG. 9 is a sectional view illustrating the ninth embodiment of the zoom lens system according to the present invention.

A ninth embodiment of the zoom lens system according to the present invention has a composition show in FIG. 9, wherein the lens system consists of a first lens unit $G_1$ which is kept stationary during zooming and has a positive refractive power, a second lens unit $G_2$ which has a negative refractive power and is moved in two directions along an optical axis during zooming mainly for changing a focal length of the zoom lens system, a third lens unit $G_3$ which has a positive refractive power and is moved in the two directions along the optical axis during zooming mainly for changing the focal length of the zoom lens system in cooperation with the second lens unit $G_2$, and a fourth lens unit $G_4$ which has a positive refractive power and is movable during zooming mainly for correcting a deviation of an image surface caused by changing the focal length.

The first lens unit $G_1$ is composed, in order from the object side, of a negative lens element, a positive lens element and a positive lens element; the second lens unit $G_2$ is composed, in order from the object side, a negative lens element, a negative lens element and a positive lens element; the third lens unit $G_3$ is composed, in order from the object side, of a positive lens element and a negative lens element; and the fourth lens unit $G_4$ is composed, in order from the object side, of a positive lens element, a negative lens element and a positive lens element.

The lens units adopted for the ninth embodiment have functions which are substantially the same as those of the lens units used in the first embodiment.

In the numerical data of the first through ninth embodiments of the present invention, the reference symbol $D_3'$ represents a variable airspace which has a value of $D_3$ in a condition where the zoom lens system is focused on an object located at a distance of 1000 mm.

I claim:

1. A zoom lens system comprising, in order from an object side to an image side:

a first lens unit having a positive refractive power;

a second lens unit having a negative refractive power; and a plurality of lens units disposed on the image side of said second lens unit having a positive refractive power as a whole, wherein at least two lens units of said first, second and plurality of lens units are moved along an optical axis during zooming for changing a focal length of said zoom lens system and correcting a deviation of an image surface caused by changing the focal length, a lens unit of said plurality of lens units is disposed at a most image side location in said zoom lens system having a positive refracting power and comprising at least one positive lens element and at least two negative lens elements, one of said at least two negative lens elements is a negative meniscus lens element having a concave surface on the image side, and said zoom lens system is configured so as to satisfy the following conditions (1), (2), (3), (4) and (5):

$$-2.0 < f_z/f_w < -1.0 \tag{1}$$

$$1.2 < v_p/v_n \tag{2}$$

$-15 < f_e/f_W < -2$     (3)

$4 < f_1/f_W < 8.4$     (4)

$-8.8 < (R_{e2} + R_{e1})/(R_{e2} - R_{e1}) < -1.6$     (5)

wherein the reference symbol $f_1$ represents a focal length of the first lens unit, the reference symbol $f_2$ designates a focal length of the second lens unit, the reference symbol $f_e$ denotes a focal length of the lens element disposed at the image side location in the zoom lens system, the reference symbol $f_W$ represents a focal length of the zoom lens system at a wide position thereof, the reference symbol $v_p$ designates an Abbe's number of at least one positive lens element comprising the lens unit disposed at the image side location, the reference symbol $v_n$ denotes an Abbe's number of at least one negative lens element comprising the lens unit disposed at the image side location, the reference symbol $R_1$ represents a radius of curvature on an object side surface of one of said at least two negative lens elements, and the reference symbol $R_{e2}$ designates a radius of curvature on an image side surface of one of said at least two negative lens elements.

2. A zoom lens system comprising, in order from an object side to an image side:

a first lens unit having a positive refractive power;

a second lens unit having a negative refractive power; and a plurality of lens units disposed on the image side of said second lens unit having a positive refractive power as a whole, wherein at least two lens units of said first, second and plurality of lens units are moved along an optical axis for changing a focal length of said zoom lens system and correcting a deviation of an image surface caused by changing the focal length, a lens unit of said plurality of lens units is disposed at a most image side location in said zoom lens system comprising at least one positive lens element and at least two negative lens elements, one of said at least two negative lens elements is a meniscus lens element having a concave surface on the image side power, at least one of said lens elements comprising the lens unit disposed at the most image side location has an aspherical surface which weakens a positive refractive power as portions of the aspherical surface are farther from the optical axis toward a margin thereof, and said zoom lens system is configured so as to satisfy the following conditions (1) and (5):

$-2.0 < f_2/f_W < -1.0$     (1)

$-8.8 < (R_{e2} + R_{e1})/(R_{e2} - R_{e1}) < -1.6$     (2)

wherein the reference symbol $f_2$ represents a focal length of the second lens unit, the reference symbol $f_W$ designates a focal length of the zoom lens system at a wide position thereof, the reference symbol $R_{e1}$ denotes a radius of curvature on an object side surface of one of said at least two negative lens elements and the reference symbol $R_{e2}$ designates a radius of curvature on an image side surface of one of the at least two negative lens elements.

3. A zoom lens system comprising, in order from an object side to an image side:

a first lens unit having a positive refractive power;

a second lens unit having a negative refractive power; and a plurality of lens units disposed on the image side of said second lens unit having a positive refractive power as a whole, wherein at least two lens units of said first second and plurality of lens units are moved along an optical axis during zooming for changing a focal length of said zoom lens system and correcting a deviation of an image surface caused by changing the focal length, a lens unit of said of plurality of lens units is disposed at a most image side location in said zoom lens system having a positive refractive power, comprising at least one positive lens element and at least two negative lens elements, and being a movable during zooming mainly for correcting a deviation of an image surface caused by zooming, and wherein said zoom lens system is configured so as to satisfy the following conditions (1), (4), (6) and (7):

$-2.0 < f_2/f_W < -1.0$     (1)

$4 < f_1/f_W < 8.4$     (4)

$0.5 < R_{e1}/D_{1T} < 3$     (6)

$0.2 < R_{e2}/D_{2T} < 1.9$     (7)

wherein the reference symbol $f_1$ represents a focal length of the first lens unit, the reference symbol $f_2$ designates a focal length of the second lens unit, the reference symbol $R_{e1}$ denotes a radius of curvature on an object side surface of one of said at least two negative lens elements, the reference symbol $R_{e2}$ represents a radius of curvature on an image side surface of one of said at least two negative lens elements, the reference symbol $D_{1T}$ denotes a distance as measured from an object side surface of one of said at least two negative lens elements to the image surface at a tele position of the zoom lens system and the reference symbol $D_{2T}$ represents a distance as measured from an image side surface of one of said at least two negative lens elements to the image surface at the tele position of the zoom lens system.

4. A zoom lens system comprising, in order from an object side to an image side:

a first lens unit having a positive refractive power;

a second lens unit having a negative refractive power; and a plurality of lens units disposed on the image side of said second lens unit having a positive refractive power as a whole, wherein at least two lens units of said first, second and plurality of lens units are moved along an optical axis during zooming for changing a focal length of said zoom lens system and correcting a deviation of an image surface caused by changing the focal length, each except one of said plurality of lens units comprises at least one positive lens element and at least one negative lens elements, a lens unit of said plurality of lens units is disposed at a most image side location in said zoom lens system having a positive refractive power and comprising at least one positive lens element and at least two negative lens elements, one of said at least two negative lens elements is a meniscus lens element having a concave surface on the image side, and said lens unit disposed at the most image side location includes at least one aspherical surface having such a shape as to weaken a positive refractive power as portions of the aspherical surface are farther from the optical axis toward a margin thereof.

5. A zoom lens system comprising, in order from an object side to an image side:

a first lens unit having a positive refractive power;

a second lens unit having a negative refractive power; and a plurality of lens units disposed on the image side of said second lens unit having a positive refractive power as a whole wherein at least two lens units of said first, second and plurality of lens units are moved along an optical axis during zooming for changing a focal length of said zoom lens system and correcting a deviation of an image surface caused by changing the focal length, a lens unit of said plurality of lens units is disposed at a most image side location in said zoom lens system having a positive refractive power and comprising at least two negative lens elements and at least one positive lens element, one of said at least two negative lens elements is a negative meniscus lens element having a concave surface on the image side, said zoom lens system is focused on an object located at a short distance by moving said lens unit disposed at the most image side location toward the object side, and said zoom lens system is configured so as to satisfy the following condition (4):

$$4 < f_1/f_w < 8.4 \quad (4)$$

wherein the reference symbol $f_1$ represents a focal length of the first lens unit and the reference symbol $f_w$ designates a focal length of the zoom lens system at a wide position thereof.

6. A zoom lens system comprising, in order from an object side to an image side:

a first lens unit having a positive refractive power;

a second lens unit having a negative refractive power;

a third lens unit having a positive refractive power; and at least one lens unit disposed on the image side of said third lens unit, wherein said second lens unit is movable along an optical axis during zooming for changing a focal length of said zoom lens system, said third lens unit is kept stationary during zooming and comprises at least one positive lens element and at least one negative lens element, said at least one lens unit disposed at the image side of said third lens unit comprises at least one positive lens element and at least two negative lens elements, one of said at least two negative lens elements is a meniscus lens element which has a concave surface on the image side, and said zoom lens system is configured so as to satisfy the following conditions (1) and (2):

$$-2.0 < f_2/f_w < -1.0 \quad (1)$$

$$1.2 < v_p/v_n \quad (2)$$

wherein the reference symbol $f_2$ represents a focal length of the second lens unit, the reference symbol $f_w$ designates a focal length of the zoom lens system at a wide position thereof, the reference symbol $v_p$ denotes an Abbe's number of at least one positive lens element comprised in the lens unit disposed at the image side location and the reference symbol $v_n$ represents an Abbe's number of at least one of said at least two negative lens elements.

7. A zoom lens system comprising, in order from an object side to an image side:

a first lens unit having a positive refractive power;

a second lens unit having a negative refractive power;

a third lens unit having a positive refractive power; and a fourth lens unit having a positive refractive power, wherein said first lens unit is kept stationary during zooming, said second lens unit is movable along an optical axis for zooming, said third lens unit is kept stationary during zooming, said fourth lens unit is movable along the optical axis for zooming, and a lens element disposed at a most image side location in said fourth lens unit is a meniscus lens element having a concave surface on the image side and a negative refractive power.

8. A zoom lens system comprising, in order from an object side to an image side:

a first lens unit having a positive refractive power;

a second lens unit having a negative refractive power;

a third lens unit having a positive refractive power; and a fourth lens unit having a positive refractive power, wherein said first lens unit is kept stationary during zooming, said second lens unit is movable along an optical axis for zooming, said third lens unit is kept stationary during zooming, said fourth lens unit is movable along the optical axis for zooming, said third lens unit comprises at least one positive lens element and at least one negative lens element, said fourth lens unit comprises at least two positive lens elements and at least two negative lens elements, and a lens element disposed at a most image side location in said fourth lens unit is a negative lens element.

9. A zoom lens system according to claim 7 wherein said fourth lens unit disposed at the image side location comprises at least one positive lens element and at least two negative lens elements.

10. A zoom lens system according to claim 1, 3, 5, or 6, wherein at least one lens element disposed in said lens unit disposed at the most image side location has at least one aspherical surface.

11. A zoom lens system according to claim 1, 2, 4, or 6 wherein said lens unit disposed at the most image side location has a positive refractive power and is movable during zooming mainly for correcting the deviation of the image surface caused by zooming.

12. A zoom lens system according to claim 1, 2, 3, 4, 6, 7 or 8 wherein said zoom lens system is focused on an object located at a short distance by moving said lens unit disposed at the most image side location toward the object side.

13. A zoom lens system according to claim 1, 2, 3, 4 or 5 wherein said plurality of lens units includes a third lens unit having a positive refractive power, said third lens unit, is kept stationary during zooming, and comprises at least one positive lens element and at least one negative lens element.

14. A zoom lens system according to claim 4, 5, 7, or 8 satisfying the following condition (1):

$$-2.0 < f_2/f_w < -1.0. \quad (1)$$

15. A zoom lens system according to claim 2, 3, 4, 5, 6, 7 or 8 satisfying the following condition (3):

$$-15 < f_r/f_w < -2. \quad (3)$$

16. A zoom lens system according to claim 2, 4, 6, 7 or 8 satisfying the following condition (4):

$$4 < f_1/f_W < 8.4. \quad (4)$$

17. A zoom lens system according to claim 3, 4, 5, 6, 7 or 8 satisfying the following condition (5):

$$-8.8 < (R_{e2}+R_{e1})/(R_{e2}-R_{e1}) < -1.6. \quad (5)$$

18. A zoom lens system according to claim 1, 2, 4, 5, 6, 7 or 8 satisfying the following condition (6):

$$0.5 < R_{e1}/D_{1T} < 3. \quad (6)$$

19. A zoom lens system according to claim 1, 2, 4, 5, 6, 7 or 8 satisfying the following condition (7):

$$0.2 < R_{e2}/D_{2T} < 1.9. \quad (7)$$

20. A zoom lens system according to claim 1, 2, 3, 4, 5, 6, 7 or 8 satisfying the following condition (8):

$$0.2 < f_{RW}/f_T < 0.5. \quad (8)$$

21. A zoom lens system according to claim 1, 2, 3, 4, 5, 6, 7 or 8 satisfying the following condition (9):

$$0.5 < D_{2W}/f_W < 3.2. \quad (9)$$

22. A zoom lens system according to claim 1, 2, 3, 4, 5, 6, 7 or 8 satisfying the following condition (10):

$$-0.3 < f_2/f_T < -0.1. \quad (10)$$

23. A zoom lens system according to claim 1, 2, 3, 4 or 5 wherein said plurality of lens units includes a third lens unit having a positive refractive power, at least one lens element disposed in said third lens unit has at least one aspherical surface.

24. A zoom lens system according to claim 7 or 8, wherein at least one lens element disposed in said fourth lens unit has at least one aspherical surface.

25. A zoom lens according to claim 5 wherein said lens unit disposed at said most image side location has a positive refractive power and is movable during zooming for correcting the deviation of the image surface caused by zooming.

* * * * *